United States Patent
Mlynarski et al.

(10) Patent No.: US 12,435,097 B2
(45) Date of Patent: Oct. 7, 2025

(54) ARGINASE INHIBITORS AND METHODS OF USE THEREOF

(71) Applicant: AstraZeneca AB, Sodertalje (SE)

(72) Inventors: Scott Nathan Mlynarski, Waltham, MA (US); Tyler Grebe, Waltham, MA (US); Sameer Kawatkar, Waltham, MA (US); Maurice Raymond Verschoyle Finlay, Cambridge (GB); Iain Simpson, Cambridge (GB)

(73) Assignee: AstraZeneca AB, Sodertalje (SE)

( * ) Notice: Subject to any disclaimer, the term of this patent is extended or adjusted under 35 U.S.C. 154(b) by 996 days.

(21) Appl. No.: 17/429,011

(22) PCT Filed: Feb. 7, 2020

(86) PCT No.: PCT/IB2020/050982
§ 371 (c)(1),
(2) Date: Aug. 6, 2021

(87) PCT Pub. No.: WO2020/161675
PCT Pub. Date: Aug. 13, 2020

(65) Prior Publication Data
US 2022/0106335 A1  Apr. 7, 2022

Related U.S. Application Data

(60) Provisional application No. 62/802,765, filed on Feb. 8, 2019.

(51) Int. Cl.
*C07F 5/02* (2006.01)
(52) U.S. Cl.
CPC .................... *C07F 5/025* (2013.01)
(58) Field of Classification Search
CPC ....................................... C07F 5/025
See application file for complete search history.

(56) References Cited

U.S. PATENT DOCUMENTS

| | | | |
|---|---|---|---|
| 11,420,984 B2 * | 8/2022 | Mlynarski | A61P 29/00 |
| 11,912,727 B2 * | 2/2024 | Mlynarski | A61P 29/00 |
| 11,952,392 B2 * | 4/2024 | Wu | A61P 35/00 |
| 12,195,485 B2 * | 1/2025 | Mlynarski | C07F 5/025 |
| 2006/0194847 A1 | 8/2006 | Cheshire et al. | |
| 2010/0189644 A1 | 7/2010 | Christianson et al. | |
| 2014/0170244 A1 | 6/2014 | Johnson | |
| 2014/0343019 A1 | 11/2014 | Van Zandt et al. | |
| 2018/0009830 A1 | 1/2018 | Blaszczyk et al. | |
| 2021/0002305 A1 * | 1/2021 | Mlynarski | C07F 5/025 |
| 2021/0040127 A1 * | 2/2021 | Achab | C07K 16/2818 |

FOREIGN PATENT DOCUMENTS

| | | | |
|---|---|---|---|
| CN | 1358187 A | 7/2002 | |
| CN | 106008569 A | 10/2016 | |
| CN | 107406464 A | 11/2017 | |
| CN | 108794517 A | 11/2018 | |
| WO | 2011/133653 A1 | 10/2011 | |
| WO | WO-2016210106 A1 * | 12/2016 | A61K 31/69 |
| WO | 2017175185 A1 | 10/2017 | |
| WO | 2018/119440 A1 | 6/2018 | |
| WO | 2019159120 A1 | 8/2019 | |
| WO | 2019177873 A1 | 9/2019 | |
| WO | 2019/205979 A1 | 10/2019 | |
| WO | 2020038983 A1 | 2/2020 | |

OTHER PUBLICATIONS

International Preliminary Report on Patentability for International Application No. PCT/IB2020/050982, mailed Aug. 19, 2021, 9 Pages.
International Search Report and Written Opinion for International Application No. PCT/IB2020/050982, mailed Apr. 23, 2020, 10 Pages.

* cited by examiner

*Primary Examiner* — George W Kosturko
(74) *Attorney, Agent, or Firm* — Yong Lu

(57) ABSTRACT

Disclosed are compounds of formula (Ib) or (Vc), or a pharmaceutically acceptable salt thereof, pharmaceutical compositions comprising compounds of formula (Ib) or (Vc) and methods of using the same for treating cancer, respiratory inflammatory disease, and inhibiting arginase; wherein $R^1$ is —H or —C(O)CH($R^{1a}$)NH$R^{1b}$; and $R^{1a}$ is selected from —H, —(C$_1$-C$_4$) alkyl and CH$_2$OR$^{1c}$; $R^{1b}$ is —H; or alternatively, $R^{1a}$ and $R^{1b}$, together with the atom to which they are attached, form a 5-membered heterocyclic ring; and $R^{1c}$ is H or —CH$_3$.

15 Claims, No Drawings

ARGINASE INHIBITORS AND METHODS OF USE THEREOF

CROSS-REFERENCE TO RELATED APPLICATIONS

This application is a U.S. National Stage application of International Application No. PCT/IB2020/050982, which was filed on Feb. 7, 2020 and claims benefit under 35 U.S.C. § 119 (e) of the U.S. Provisional Application No. 62/802,765, filed Feb. 8, 2019. Each of the above listed applications is incorporated by reference herein in its entirety for all purposes.

BACKGROUND

Arginase is a manganese metalloenzyme that catalyzes the conversion of L-arginine to urea and L-ornithine. Two isoforms exist: Arginase 1 is a cytosolic enzyme predominantly found in hepatocytes where it plays a critical role in removing ammonia through urea synthesis, and Arginase 2, a mitochondrial enzyme highly expressed in kidney involved in production of ornithine, a precursor for polyamines and prolines important for cell proliferation and collagen production, respectively.

Although L-arginine is not an essential amino acid as it can be provided through protein turnover in healthy adults, increased expression and secretion of arginases results in reduced L-arginine levels in various physiologic and pathologic conditions (e.g., pregnancy, auto-immune diseases, cancer). Immune cells, in particular, are sensitive to reduced L-arginine levels. T-cells, when faced with a low L-arginine microenvironment, reduce their proliferation rate and lower the expression of CD3ζ chain, IFNγ, and lytic enzymes resulting in impaired T-cell responsiveness. Dendritic cells respond to low L-arginine conditions by reducing their ability to present antigens, and natural killer cells reduce both proliferation and expression of lytic enzymes.

Tumors use multiple immune suppressive mechanisms to evade the immune system. One of these is the reduction of L-arginine through increased levels of circulating arginase, increased expression and secretion of arginase by tumor cells, and recruitment of arginase expressing and secreting myeloid derived suppressor cells. Together, these lead to a reduction of L-arginine in the tumor microenvironment and an immune-suppressive phenotype. Pharmacologic inhibition of arginase activity has been shown to reverse the low L-arginine induced immune suppression in animal models. As such, there is a need for potent and selective arginase inhibitors to reverse immune suppression and re-activate anti-cancer immunity in patients, either as single agent, or in combination with therapies reversing additional immune-suppressive mechanisms.

SUMMARY

In one embodiment, disclosed is a compound of formula (Ib), or a pharmaceutically acceptable salt thereof:

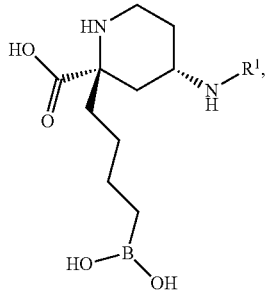

(Ib)

wherein $R^1$ is —H or —C(O)CH($R^{1a}$)NH$R^{1b}$; and $R^{1a}$ is selected from —H, —(C$_1$-C$_6$) alkyl and CH$_2$OR$^{1c}$;

$R^{1b}$ is —H; or alternatively, $R^{1a}$ and $R^{1b}$, together with the atom to which they are attached, form a 5-membered heterocyclic ring; and $R^{1c}$ is H or —CH$_3$.

In one embodiment, disclosed is a compound of formula (II), or a pharmaceutically acceptable salt thereof:

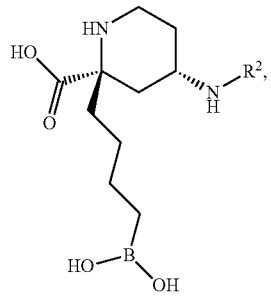

(II)

wherein $R^2$ is —H or —C(O)CH($R^{2a}$)NH$_2$; and $R^{2a}$ is selected from —H or —(C$_1$-C$_6$) alkyl.

In one embodiment, disclosed is a pharmaceutically acceptable salt thereof:

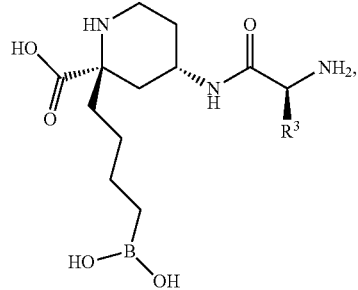

(III)

wherein $R^3$ is selected from —H or —(C$_1$-C$_4$) alkyl.

In one embodiment, disclosed is a compound of formula (IVb), or a pharmaceutically acceptable salt thereof:

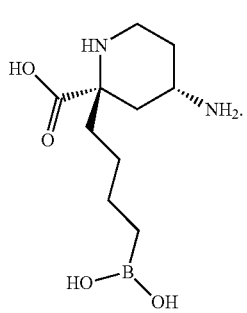

(IVb)

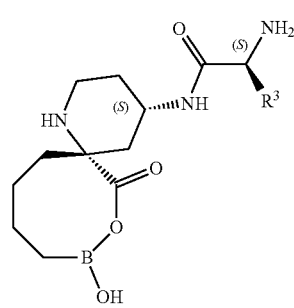

(VII)

wherein
R³ is selected from —H or —(C₁-C₄) alkyl.

In one embodiment, disclosed is a compound of formula (VIIIb), or a pharmaceutically acceptable salt thereof:

In one embodiment, disclosed is a compound of formula (Vc), or a pharmaceutically acceptable salt thereof:

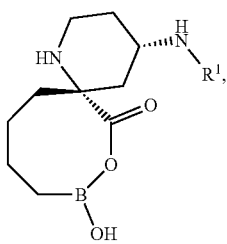

(Vc)

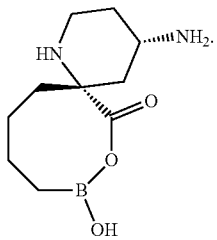

(VIIIb)

wherein
$R^1$ is —H or —C(O)CH($R^{1a}$)NH$R^{1b}$; and
$R^{1a}$ is selected from —H, —(C₁-C₄) alkyl and CH₂O$R^{1c}$;
$R^{1b}$ is —H; or alternatively, $R^{1a}$ and $R^{1b}$, together with the atom to which they are attached, form a 5-membered heterocyclic ring; and
$R^{1c}$ is H or —CH₃.

In one embodiment, disclosed is a compound of formula (VI), or a pharmaceutically acceptable salt thereof:

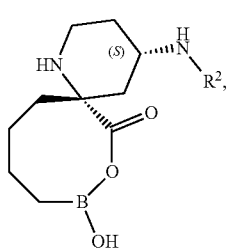

(VI)

wherein
$R^2$ is —H or —C(O)CH($R^{2a}$)NH₂; and
$R^{2a}$ is selected from —H or —(C₁-C₆) alkyl.

In one embodiment, disclosed is a compound of formula (VII), or a pharmaceutically acceptable salt thereof:

In some embodiments, disclosed are the compounds of Table 1, or a pharmaceutically acceptable salt thereof.

In some embodiments, disclosed are pharmaceutical compositions comprising a compound of formula (Ib), (II), (III), (IVb), (Vc), (VI), (VII), and (VIIIb) including any subgenera or species thereof, or Table 1, or a pharmaceutically acceptable salt thereof, and a pharmaceutically acceptable carrier.

In some embodiments, disclosed are methods of treating cancer in a patient comprising administering to the patient a compound of formula (Ib), (II), (III), (IVb), (Vc), (VI), (VII), and (VIIIb) including any subgenera or species thereof, or Table 1, or a pharmaceutically acceptable salt thereof.

In some embodiments, disclosed are compounds of formula (Ib), (II), (III), (IVb), (Vc), (VI), (VII), and (VIIIb) including any subgenera or species thereof, or Table 1, or a pharmaceutically acceptable salt thereof, for treating cancer.

In some embodiments, disclosed is the use of a compound of formula (I), (II), (III), (IV), (V), (VI), (VII), and (VIII), including any subgenera or species thereof, or Table 1, or a pharmaceutically acceptable salt thereof in the manufacture of a medicament for use in treating cancer.

In some embodiments, disclosed are pharmaceutical compositions comprising a compound of formula (Ib), (II), (III), (IVb), (Vc), (VI), (VII), and (VIIIb) including any subgenera or species thereof, or Table 1, or a pharmaceutically acceptable salt thereof, for use in treating cancer.

In some embodiments, disclosed are methods of treating a respiratory inflammatory disease in a patient comprising administering to the patient a compound of formula (Ib), (II), (III), (IVb), (Vc), (VI), (VII), and (VIIIb) including any subgenera or species thereof, or Table 1, or a pharmaceutically acceptable salt thereof.

In some embodiments, disclosed are compounds of formula (Ib), (II), (III), (IVb), (Vc), (VI), (VII), and (VIIIb) including any subgenera or species thereof, or Table 1, or a pharmaceutically acceptable salt thereof, for treating a respiratory inflammatory disease.

In some embodiments, disclosed is the use of a compound of formula (I), (II), (III), (IV), (V), (VI), (VII), and (VIII), including any subgenera or species thereof, or Table 1, or a pharmaceutically acceptable salt thereof in the manufacture of a medicament for use in treating a respiratory inflammatory disease.

In some embodiments, disclosed are pharmaceutical compositions comprising a compound of formula (Ib), (II), (III), (IVb), (Vc), (VI), (VII), and (VIIIb) including any subgenera or species thereof, or Table 1, or a pharmaceutically acceptable salt thereof, for use in treating a respiratory inflammatory disease.

In some embodiments, the aforementioned respiratory inflammatory disease is chronic obstructive pulmonary disease (COPD) or asthma.

DETAILED DESCRIPTION

Compounds

In one embodiment, disclosed is a compound of formula (I), or a pharmaceutically acceptable salt thereof:

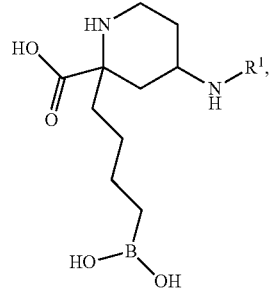

(I)

wherein
$R^1$ is —H or —C(O)CH($R^{1a}$)NHR$^{1b}$; and
$R^{1a}$ is selected from —H, —(C$_1$-C$_6$) alkyl and CH$_2$OR$^{1c}$;
$R^{1b}$ is —H; or alternatively, $R^{1a}$ and $R^{1b}$, together with the atom to which they are attached, form a 5-membered heterocyclic ring; and
$R^{1c}$ is H or —CH$_3$.

In one embodiment, disclosed is a compound of formula (I). In another embodiment, disclosed is a pharmaceutically acceptable salt of the compound of formula (I).

In some embodiments of formula (I), $R^1$ is —H.

In some embodiments of formula (I), $R^1$ is —C(O)CH ($R^{1a}$)NHR$^{1b}$; $R^{1a}$ is —H; and $R^{1b}$ is —H.

In some embodiments of formula (I), $R^1$ is —C(O)CH ($R^{1a}$)NHR$^{1b}$; $R^{1a}$ is —(C$_1$-C$_6$) alkyl; and $R^{1b}$ is —H.

In some embodiments of formula (I), $R^1$ is —C(O)CH ($R^{1a}$)NHR$^{1b}$; $R^{1a}$ is CH$_2$OR$^{1c}$; and $R^{1b}$ is —H.

In some embodiments of formula (I), $R^1$ is —C(O)CH ($R^{1a}$)NHR$^{1b}$; and $R^{1a}$ and $R^{1b}$, together with the atom to which they are attached, form a 5-membered heterocyclic ring.

In any of the preceding embodiments of formula (I), the compound is represented by any of the following structural formula:

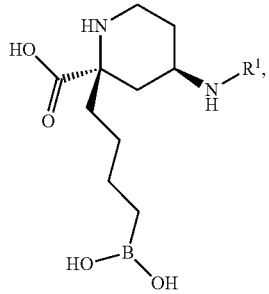

(Ia)

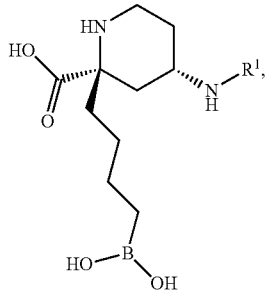

(Ib)

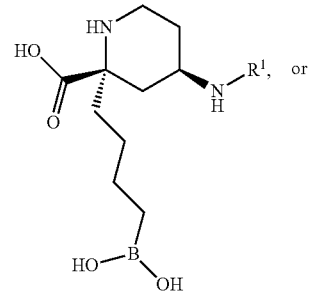

(Ic) or

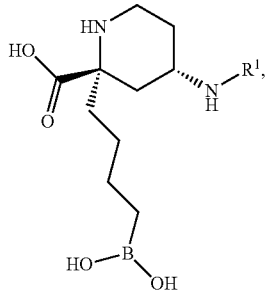

(Id)

wherein $R^1$ is the same as defined above.

In one embodiment, disclosed is a compound of formula (II), or a pharmaceutically acceptable salt thereof:

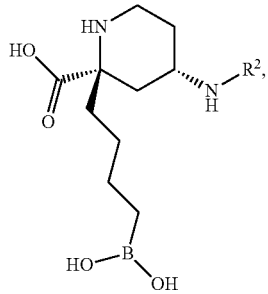

(II)

wherein
R² is —H or —C(O)CH(R²ᵃ)NH₂; and
R²ᵃ is selected from —H or —(C₁-C₆) alkyl.

In one embodiment, disclosed is a compound of formula (II). In another embodiment, disclosed is a pharmaceutically acceptable salt of the compound of formula (II).

In some embodiments of formula (II), R² is —H.

In some embodiments of formula (II), R² is —C(O)CH(R²ᵃ)NH₂; and R²ᵃ is —H.

In some embodiments of formula (II), R² is —C(O)CH(R²ᵃ)NH₂; and R²ᵃ is —(C₁-C₆) alkyl.

In one embodiment, disclosed is a pharmaceutically acceptable salt thereof:

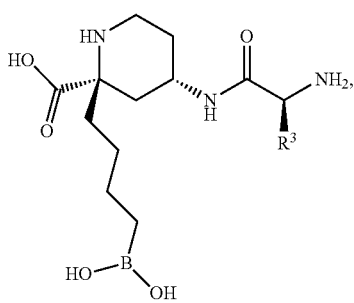

(III)

wherein R³ is selected from —H or —(C₁-C₄) alkyl.

In one embodiment, disclosed is a compound of formula (III). In another embodiment, disclosed is a pharmaceutically acceptable salt of the compound of formula (III).

In some embodiments of formula (III), R³ is —H.

In some embodiments of formula (III), R³ is —(C₁-C₄) alkyl.

In one embodiment, disclosed is a compound of formula (IV), or a pharmaceutically acceptable salt thereof:

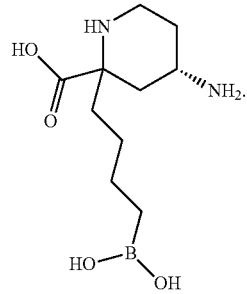

(IV)

In one embodiment, disclosed is a compound of formula (IV). In another embodiment, disclosed is a pharmaceutically acceptable salt of the compound of formula (IV).

In some embodiments of formula (IV), the compound is represented by one of the following structural formula:

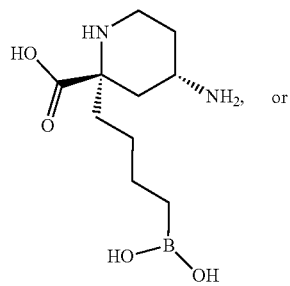

(IVa)

or (IVb)

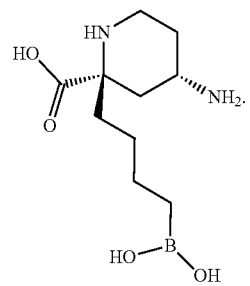

In one embodiment, disclosed is a compound of formula (V), or a pharmaceutically acceptable salt thereof:

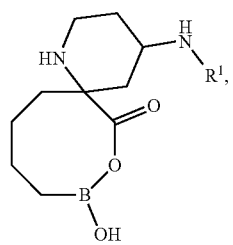

(V)

wherein
R¹ is —H or —C(O)CH(R¹ᵃ)NHR¹ᵇ; and
R¹ᵃ is selected from —H, —(C₁-C₄) alkyl and CH₂OR¹ᶜ;
R¹ᵇ is —H; or alternatively, R¹ᵃ and R¹ᵇ, together with the atom to which they are attached, form a 5-membered heterocyclic ring; and
R¹ᶜ is H or —CH₃.

In one embodiment, disclosed is a compound of formula (V). In another embodiment, disclosed is a pharmaceutically acceptable salt of the compound of formula (V).

In some embodiments of formula (V), $R^1$ is —H.

In some embodiments of formula (V), $R^1$ is —C(O)CH$(R^{1a})$NHR$^{1b}$; $R^{1a}$ is —H; and $R^{1b}$ is —H.

In some embodiments of formula (V), $R^1$ is —C(O)CH$(R^{1a})$NHR$^{1b}$; $R^{1a}$ is —$(C_1$-$C_6)$ alkyl; and $R^{1b}$ is —H.

In some embodiments of formula (V), $R^1$ is —C(O)CH$(R^{1a})$NHR$^{1b}$; $R^{1a}$ is CH$_2$OR$^{1c}$; and $R^{1b}$ is —H.

In some embodiments of formula (V), $R^1$ is —C(O)CH$(R^{1a})$NHR$^{1b}$; and $R^{1a}$ and $R^{1b}$, together with the atom to which they are attached, form a 5-membered heterocyclic ring.

In any of the preceding embodiments of formula (V), the compound is represented by any of the following structural formula:

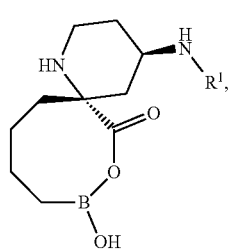
(Va)

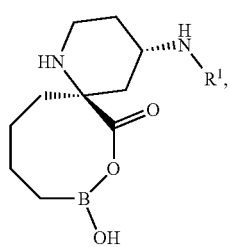
(Vb)

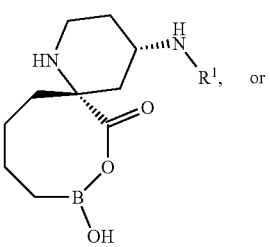
(Vc)

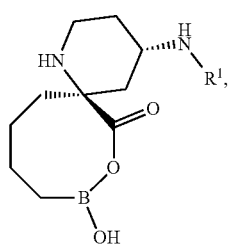
(Vd)

wherein $R^1$ is the same as defined above.

In one embodiment, disclosed is a compound of formula (VI), or a pharmaceutically acceptable salt thereof:

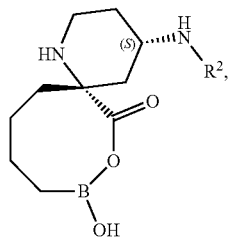
(VI)

wherein
$R^2$ is —H or —C(O)CH$(R^{2a})$NH$_2$; and
$R^{2a}$ is selected from —H or —$(C_1$-$C_6)$ alkyl.

In one embodiment, disclosed is a compound of formula (VI). In another embodiment, disclosed is a pharmaceutically acceptable salt of the compound of formula (VI).

In some embodiments of formula (VI), $R^2$ is —H.

In some embodiments of formula (VI), $R^2$ is —C(O)CH$(R^{2a})$NH$_2$; and $R^{2a}$ is —H.

In some embodiments of formula (VI), $R^2$ is —C(O)CH$(R^{2a})$NH$_2$; and $R^{2a}$ is —$(C_1$-$C_6)$ alkyl.

In one embodiment, disclosed is a compound of formula (VII), or a pharmaceutically acceptable salt thereof:

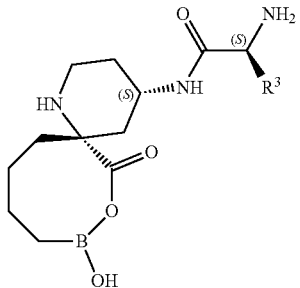
(VII)

wherein
$R^3$ is selected from —H or —$(C_1$-$C_4)$ alkyl.

In one embodiment, disclosed is a compound of formula (VII). In another embodiment, disclosed is a pharmaceutically acceptable salt of the compound of formula (VII).

In some embodiments of formula (III), $R^3$ is —H.

In some embodiments of formula (III), $R^3$ is —$(C_1$-$C_4)$ alkyl.

In one embodiment, disclosed is a compound of formula (VIII), or a pharmaceutically acceptable salt thereof:

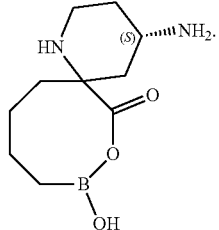
(VIII)

In one embodiment, disclosed is a compound of formula (VIII). In another embodiment, disclosed is a pharmaceutically acceptable salt of the compound of formula (VIII).

In some embodiments of formula (VIII), the compound is represented by one of the following structural formula:

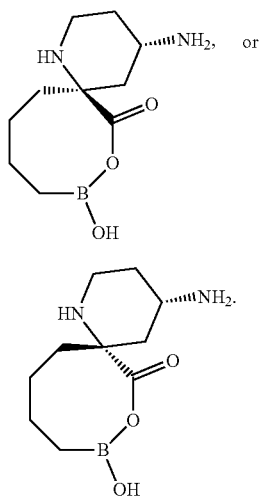

In some embodiments, the compounds of formula (I), (II), (III), and (IV) including any subgenera and species thereof are converted to the compounds of formula (V), (VI), (VII), and (VIII) including any subgenera and species thereof via intramolecular cyclization, and vice versa. That is, it is an interconversion process. The compounds of formula (I), (II), (III), and (IV) including subgenera and species thereof and the compounds of formula (V), (VI), (VII), and (VIII) including subgenera and species thereof are each converted into the other partially or completely depending on the conditions, such as temperature, pressure, humidity, the pH and/or composition of medium (e.g., solvents), and etc. It is illustrated in the scheme below:

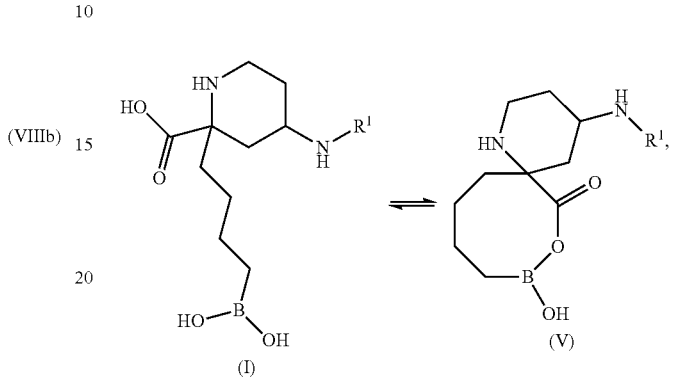

wherein $R^1$ is the same as defined in formula (I) and (V) above.

In some embodiments, disclosed are compounds of Table 1, or a pharmaceutically acceptable salt thereof:

TABLE 1

| Example | Compound | Name |
|---|---|---|
| 1 | ![structure] | (2R,4S)-4-amino-2-(4-boronobutyl)piperidine-2-carboxylic acid |
| 2 | ![structure] | (2R,4S)-4-((S)-2-amino-3-methylbutanamido)-2-(4-boronobutyl)piperidine-2-carboxylic acid |

TABLE 1-continued

| Example | Compound | Name |
|---|---|---|
| 3 | | (2R,4S)-4-(2-aminoacetamido)-2-(4-boronobutyl)piperidine-2-carboxylic acid |
| 4 | | (2R,4S)-4-[[(2S)-2-aminopropanoyl]amino]-2-(4-boronobutyl)piperidine-2-carboxylic acid |
| 5 | | (2R,4S)-4-[[(2S)-2-aminobutanoyl]amino]-2-(4-boronobutyl)piperidine-2-carboxylic acid |
| 6 | | (2R,4S)-4-[[(2S)-2-amino-4-methyl-pentanoyl]amino]-2-(4-boronobutyl)piperidine-2-carboxylic acid |
| 7 | | (2R,4S)-4-[[(2S,3S)-2-amino-3-methyl-pentanoyl]amino]-2-(4-boronobutyl)piperidine-2-carboxylic acid |

TABLE 1-continued

| Example | Compound | Name |
|---|---|---|
| 8 | | (2R,4S)-4-[[(2S)-2-amino-3,3-dimethyl-butanoyl]amino]-2-(4-boronobutyl)piperidine-2-carboxylic acid |
| 9 | | (2R,4S)-4-[[(2R)-2-amino-3-methyl-butanoyl]amino]-2-(4-boronobutyl)piperidine-2-carboxylic acid |
| 10 | Enantiomer 1 | Anti-4-amino-2-(4-boronobutyl)piperidine-2-carboxylic acid enantiomer 1 |
| 11 | Enantiomer 2 | Anti-4-amino-2-(4-boronobutyl)piperidine-2-carboxylic acid enantiomer 2 |
| 12 | | (2S,4R)-4-amino-2-(4-boronobutyl)piperidine-2-carboxylic acid |

The stereochemical configurations in chemical structures herein are depicted via wedge notations (including solid wedge and broken/hashed wedge), bold lines, and dotted lines. The wedge notations are used to indicate absolute stereochemistry. In particular, the wedge notations are used to indicate the position of chemical bonds relative to the plane of the drawing surface wherein the solid wedge indicates the bond is projecting out towards the viewer; the broken (hashed) wedge indicates the bond is receding away from the viewer. For example, the chemical structures of Examples 1 to 9 and 12 have wedge notations indicating the absolute stereochemistry. On the other hand, the bold and dotted lines are used to indicate relative stereochemistry, such as, e.g., bold lines on a ring indicate the bonds on the same side, i.e., a syn relationship, while dotted line on the ring indicates the bond on the opposite side of the bold lines, i.e., an anti relationship. For example, the chemical structures of Examples 10 and 11 have bold and dotted lines indicating the relative stereochemistry of the two enantiomers.

The language "$C_1$-$C_4$ alkyl" includes acyclic alkyl moieties having 1 to 4 carbon atoms, and "$C_1$-$C_6$ alkyl" includes acyclic alkyl moieties having 1 to 6 carbon atoms. Examples of $C_1$-$C_4$ alkyl moieties include methyl, ethyl, n-propyl, isopropyl, n-butyl, sec-butyl, isobutyl, and tert-butyl.

The language "pharmaceutically acceptable salt" includes acid addition or base addition salts that retain the biological effectiveness and properties of the compounds of formula (Ib), (II), (III), (IVb), (Vc), (VI), (VII), and (VIIIb) including any subgenera or species thereof, and Table 1 and, which typically are not biologically or otherwise undesirable. In many cases, the compounds of formula (Ib), (II), (III), (IVb), (Vc), (VI), (VII), and (VIIIb) including any subgenera or species thereof, and Table 1 are capable of forming acid and/or base salts by virtue of the presence of basic and/or carboxyl groups or groups similar thereto.

Pharmaceutically acceptable acid addition salts can be formed with inorganic acids and organic acids, e.g., acetate, aspartate, benzoate, besylate, bromide/hydrobromide, bicarbonate/carbonate, bisulfate/sulfate, camphorsulfonate, chloride/hydrochloride, chlortheophyllonate, citrate, ethanedisulfonate, fumarate, gluceptate, gluconate, glucuronate, hippurate, hydroiodide/iodide, isethionate, lactate, lactobionate, laurylsulfate, malate, maleate, malonate, mandelate, mesylate, methylsulfate, naphthoate, napsylate, nicotinate, nitrate, octadecanoate, oleate, oxalate, palmitate, palmoate, phosphate/hydrogen phosphate/dihydrogen phosphate, polygalacturonate, propionate, stearate, succinate, subsalicylate, sulfate/hydrogensulfate, tartrate, tosylate and trifluoroacetate salts. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, oxalic acid, maleic acid, malonic acid, succinic acid, fumaric acid, tartaric acid, citric acid, benzoic acid, mandelic acid, methanesulfonic acid, ethanesulfonic acid, toluenesulfonic acid, trifluoroacetic acid, sulfosalicylic acid, and the like.

Pharmaceutically acceptable base addition salts can be formed with inorganic and organic bases. Inorganic bases from which salts can be derived include, for example, ammonia and salts of aminonium and metals from columns I to XII of the periodic table. In certain embodiments, the salts are derived from sodium, potassium, aminonium, calcium, magnesium, iron, silver, zinc, and copper; particularly suitable salts include aminonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like. Certain organic amines include isopropylamine, benzathine, cholinate, diethanolamine, diethylamine, lysine, meglumine, piperazine and tromethamine.

The pharmaceutically acceptable salts of the compounds of formula (Ib), (II), (III), (IVb), (Vc), (VI), (VII), and (VIIIb) including any subgenera or species thereof, and Table 1 can be synthesized from a basic or acidic moiety, by conventional chemical methods. Generally, such salts can be prepared by reacting free acid forms of these compounds with a stoichiometric amount of the appropriate base (such as $Na^+$, $Ca^{2+}$, $Mg^{2+}$, or $K^+$ hydroxide, carbonate, bicarbonate or the like), or by reacting free base forms of these compounds with a stoichiometric amount of the appropriate acid. Such reactions are typically carried out in water or in an organic solvent, or in a mixture of the two. Generally, use of non-aqueous media like ether, ethyl acetate, ethanol, isopropanol, or acetonitrile is desirable, where practicable. Lists of additional suitable salts can be found, e.g., in "Remington's Pharmaceutical Sciences," 20th ed., Mack Publishing Company, Easton, Pa., (1985); Berge et al., "*J. Pharm. Sci.,* 1977, 66, 1-19 and in "Handbook of Pharmaceutical Salts: Properties, Selection, and Use" by Stahl and Wermuth (Wiley-VCH, Weinheim, Germany, 2002).

Any formula given herein is also intended to represent unlabeled forms as well as isotopically labeled forms for the compounds of formula (Ib), (II), (III), (IVb), (Vc), (VI), (VII), and (VIIIb) including any subgenera or species thereof, and Table 1. Isotopically labeled compounds have structures depicted by the formulas given herein except that one or more atoms are replaced by an atom of the same element but with differing mass number. Examples of isotopes that can be incorporated into the compounds of formula (Ib), (II), (III), (IVb), (Vc), (VI), (VII), and (VIIIb) including any subgenera or species thereof, and Table 1 and their pharmaceutically acceptable salts include isotopes of hydrogen, carbon, nitrogen, oxygen, phosphorous, sulfur, fluorine, chlorine and iodine, such as $^2H$, $^3H$, $^{11}C$, $^{13}C$, $^{14}C$, $^{15}N$, $^{35}S$, $^{36}Cl$ and $^{125}I$. Isotopically labeled compounds of formula (Ib), (II), (III), (IVb), (Vc), (VI), (VII), and (VIIIb) including any subgenera or species thereof, and Table 1 can generally be prepared by conventional techniques known to those skilled in the art or by processes analogous to those described in the accompanying Examples using appropriate isotopically labeled reagents in place of the non-labeled reagents previously employed.

The compounds of formula (Ib), (II), (III), (IVb), (Vc), (VI), (VII), and (VIIIb) including any subgenera or species thereof, and Table 1 may have different isomeric forms. The language "optical isomer," "stereoisomer" "enantiomer" or "diastereoisomer" refers to any of the various stereoisomeric configurations which may exist for a given compound of formula (Ib), (II), (III), (IVb), (Vc), (VI), (VII), and (VIIIb) including any subgenera or species thereof, and Table 1. It is understood that a substituent may be attached at a chiral center of a carbon atom and, therefore, the disclosed compounds include enantiomers, diastereomers and racemates. The term "enantiomer" includes pairs of stereoisomers that are non-superimposable mirror images of each other. A 1:1 mixture of a pair of enantiomers is a racemic mixture. The term is used to designate a racemic mixture where appropriate. The terms "diastereomers" or "diastereoisomers" include stereoisomers that have at least two asymmetric atoms, but which are not mirror images of each other. The absolute stereochemistry is specified according to the Cahn-Ingold-Prelog R-S system. When a compound is a pure enantiomer, the stereochemistry at each chiral center may be specified by either R or S. Resolved compounds whose absolute configuration is unknown can be designated (+) or (−) depending on the direction (dextro- or levorotatory) which they rotate plane polarized light at the wavelength of the sodium D line. Certain of the compounds of formula (Ib), (II), (III), (IVb), (Vc), (VI), (VII), and (VIIIb) including any subgenera or species thereof, and Table 1 contain one or more asymmetric centers or axes and may thus give rise to enantiomers, diastereomers or other stereoisomeric forms that may be defined, in terms of absolute stereochemistry, as (R)- or (S)-. The present disclosure is meant to include all such possible isomers, including racemic mixtures, optically pure forms and intermediate mixtures. Optically active (R)- and (S)-isomers may be prepared using chiral synthons or chiral reagents, or resolved using conventional techniques well known in the art, such as chiral HPLC.

Also disclosed herein the Intermediates 1-48 in the Examples, and salts thereof.

Pharmaceutical Compositions

In some embodiments, disclosed are pharmaceutical compositions comprising a compound of formula (Ib), (II), (III), (IVb), (Vc), (VI), (VII), and (VIIIb) including any subgenera or species thereof, or Table 1, and a pharmaceutically acceptable carrier.

The language "pharmaceutically acceptable carrier" includes compounds, materials, compositions, and/or dosage forms which are, within the scope of sound medical judgment, suitable for use in contact with the tissues of human beings and animals without excessive toxicity, irritation, allergic response, or other problem or complication, as ascertained by one of skill in the art.

The disclosed compositions may be in a form suitable for oral use (for example, as tablets, lozenges, hard or soft capsules, aqueous or oily suspensions, emulsions, dispersible powders or granules, syrups or elixirs), for topical use (for example, as creams, ointments, gels, or aqueous or oily solutions or suspensions), for administration by inhalation (for example, as a finely divided powder or a liquid aerosol), for administration by insufflation (for example, as a finely divided powder) or for parenteral administration (for example, as a sterile aqueous or oily solution for intravenous, subcutaneous, intramuscular or intramuscular dosing or as a suppository for rectal dosing).

The amount of active ingredient that is combined with one or more pharmaceutically acceptable carriers to produce a single dosage form will necessarily vary depending upon the host treated and the particular route of administration. For further information on Routes of Administration and Dosage Regimes the reader is referred to Chapter 25.3 in Volume 5 of Comprehensive Medicinal Chemistry (Corwin Hansch; Chairman of Editorial Board), Pergamon Press 1990.

Therapeutic Utilities

The present compounds are useful as arginase inhibitors in therapies.

In one aspect, disclosed are methods for treating cancer in a subject in need thereof, comprising administering to the subject an effective amount of a compound of formula (Ib), (II), (III), (IVb), (Vc), (VI), (VII), and (VIIIb) including any subgenera or species thereof, or Table 1, or a pharmaceutically acceptable salt thereof.

In one aspect, disclosed are methods for treating a respiratory inflammatory disease in a subject in need thereof, comprising administering to the subject an effective amount of a compound of formula (Ib), (II), (III), (IVb), (Vc), (VI), (VII), and (VIIIb) including any subgenera or species thereof, or Table 1, or a pharmaceutically acceptable salt thereof.

In one aspect, disclosed is a compound of formula (Ib), (II), (III), (IVb), (Vc), (VI), (VII), and (VIIIb) including any subgenera or species thereof, or Table 1, or a pharmaceutically acceptable salt thereof, for use in treating cancer.

In one aspect, disclosed is a compound of formula (Ib), (II), (III), (IVb), (Vc), (VI), (VII), and (VIIIb) including any subgenera or species thereof, or Table 1, or a pharmaceutically acceptable salt thereof, for use in treating a respiratory inflammatory disease.

In one aspect, disclosed is the use of a compound of formula (Ib), (II), (III), (IVb), (Vc), (VI), (VII), and (VIIIb) including any subgenera or species thereof, or Table 1, or a pharmaceutically acceptable salt, in the manufacture of a medicament for treating cancer.

In one aspect, disclosed is the use of a compound of formula (Ib), (II), (III), (IVb), (Vc), (VI), (VII), and (VIIIb) including any subgenera or species thereof, or Table 1, or a pharmaceutically acceptable salt, in the manufacture of a medicament for treating a respiratory inflammatory disease.

In one aspect, disclosed are pharmaceutical compositions comprising a compound of formula (Ib), (II), (III), (IVb), (Vc), (VI), (VII), and (VIIIb) including any subgenera or species thereof, or Table 1, or a pharmaceutically acceptable salt thereof, for use in treating cancer.

In one aspect, disclosed are pharmaceutical compositions comprising a compound of formula (Ib), (II), (III), (IVb), (Vc), (VI), (VII), and (VIIIb) including any subgenera or species thereof, or Table 1, or a pharmaceutically acceptable salt thereof, for use in treating a respiratory inflammatory disease.

The term "cancer" includes, for example, renal cell carcinoma, head and neck squamous cell carcinoma, lung cancer (e.g., small cell lung cancer (SCLC), non-small cell lung cancer (NSCLC), mesothelioma), pancreatic cancer, colorectal cancer, breast cancer, acute myeloid leukemia (AML), prostate cancer, gastric cancer, bladder cancer, melanoma, renal cancer and ovarian cancer. In some embodiments, the cancer has metastasized. In some embodiments, the cancer is associated with Arginase 1 and/or Arginase 2 modulation.

In some embodiments, the cancer is associated with increased plasma Arginase 1 levels. In some embodiments, the cancer is associated with decreased plasma arginine levels. In some embodiments, the cancer is associated with both increased plasma Arginase 1 levels and decreased plasma arginine levels. In some embodiments, the cancer associated with increased plasma Arginase 1 levels and/or decreased plasma arginine levels includes renal cell carcinoma, head and neck squamous cell carcinoma, lung cancer (e.g., small cell lung cancer (SCLC), non-small cell lung cancer (NSCLC), mesothelioma), pancreatic cancer, colorectal cancer and breast cancer.

In some embodiments, the cancer secretes Arginase 2, for example, acute myeloid leukemia and prostate cancer.

In some embodiments, the cancer is associated with Arginase 1 positive tumor infiltrating immune cells, for example, lung cancer (small cell lung cancer (SCLC), non-small cell lung cancer (NSCLC), gastric cancer, bladder cancer, colorectal cancer, melanoma, head and neck squamous cell carcinoma, breast cancer, prostate cancer, ovarian cancer, pancreatic cancer and renal cancer.

The term "a respiratory inflammatory disease" refers to inflammatory conditions or disorders that affect the airspaces, pulmonary vasculature, pulmonary interstitium, or a combination thereof. They can be isolated to the lung or involve multiple organs. In one embodiment, the respiratory inflammatory disease is an inflammatory lung disease. In another embodiment, the inflammatory lung disease is non-infectious.

In some embodiments, the respiratory inflammatory disease is asthma, chronic obstructive pulmonary disease (COPD), chemically-induced lung fibrosis, idiopathic pulmonary fibrosis, cystic fibrosis, or a combination thereof. In some embodiments, the respiratory inflammatory disease is chronic obstructive pulmonary disease (COPD) or asthma.

In one aspect, disclosed are methods for inhibiting arginase in a subject in need thereof, comprising administering to the subject an effective amount of a compound of formula (Ib), (II), (III), (IVb), (Vc), (VI), (VII), and (VIIIb) including any subgenera or species thereof, or Table 1, or a pharmaceutically acceptable salt thereof.

In one aspect, disclosed is a compound of formula (Ib), (II), (III), (IVb), (Vc), (VI), (VII), and (VIIIb) including any subgenera or species thereof, or Table 1, or a pharmaceutically acceptable salt thereof, for use in inhibiting arginase.

In one aspect, disclosed is the use of a compound of formula (Ib), (II), (III), (IVb), (Vc), (VI), (VII), and (VIIIb) including any subgenera or species thereof, or Table 1, or a pharmaceutically acceptable salt thereof, in the manufacture of a medicament for inhibiting arginase.

In one aspect, disclosed are pharmaceutical compositions comprising a compound of formula (Ib), (II), (III), (IVb), (Vc), (VI), (VII), and (VIIIb) including any subgenera or species thereof, or Table 1, or a pharmaceutically acceptable salt thereof, for use in inhibiting arginase.

The term "arginase" includes manganese-containing enzymes belonging to the uerohydrolase family that catalyze the fifth and final step in the urea cycle converting L-arginine into L-ornithine and urea. The term "arginase" includes the two isozymes of the enzyme, e.g., Arginase 1, which functions in the urea cycle, and is located primarily in the cytoplasm of the liver, and Arginase 2, which is located in the mitochondria of several tissues in the body and is implicated in the regulation of arginine/ornithine concentrations in the cell. In some embodiments, the compounds of formula (Ib), (II), (III), (IVb), (Vc), (VI), (VII), and (VIIIb) including any subgenera or species thereof, and Table 1, or a pharmaceutically acceptable salt thereof, are selective for arginase 1. In some embodiments, the compounds of formula (Ib), (II), (III), (IVb), (Vc), (VI), (VII), and (VIIIb) including any subgenera or species thereof, and Table 1, or a pharmaceutically acceptable salt thereof, are selective for Arginase 2. In some embodiments, the compounds of formula (Ib), (II), (III), (IVb), (Vc), (VI), (VII), and (VIIIb) including any subgenera or species thereof, and Table 1, or a pharmaceutically acceptable salt thereof, are inhibit both Arginase 1 and Arginase 2.

The language "effective amount" includes an amount of a compound of formula (Ib), (II), (III), (IVb), (Vc), (VI), (VII), and (VIIIb) including any subgenera or species thereof, or Table 1 that will elicit a biological or medical response in a subject, for example, the reduction or inhibition of enzyme or protein activity related to arginase or cancer, amelioration of symptoms of cancer or the slowing or delaying of progression of cancer. In some embodiments, the language "effective amount" includes the amount of a compound of formula (Ib), (II), (III), (IVb), (Vc), (VI), (VII), and (VIIIb) including any subgenera or species thereof, or Table 1, that when administered to a subject, is effective to at least partially alleviate, inhibit, and/or ameliorate cancer or inhibit arginase, and/or reduce or inhibit the growth of a tumor or proliferation of cancerous cells in a subject.

The term "subject" includes warm blooded mammals, for example, primates, dogs, cats, rabbits, rats, and mice. In some embodiments, the subject is a primate, for example, a human. In some embodiments, the subject is suffering from cancer. In some embodiments, the subject is in need of treatment (e.g., the subject would benefit biologically or medically from treatment). In some embodiments, the patient is suffering from cancer. In some embodiments, the subject has increased plasma Arginase 1 levels. In some embodiments, the subject has decreased arginine levels. In some embodiments, the patient has both increased plasma Arginase 1 levels and decreased arginine levels. In some embodiments, the subject has a cancer secreting Arginase 2 (e.g., acute myeloid leukemia or prostate cancer). In some embodiments, the subject has Arginase 1 positive tumor infiltrating immune cells.

The language "inhibit," "inhibition" or "inhibiting" includes a decrease in the baseline activity of a biological activity or process. In some embodiments, the compounds of formula formula (Ib), (II), (III), (IVb), (Vc), (VI), (VII), and (VIIIb) including any subgenera or species thereof, and Table 1 inhibit arginase.

The language "treat," "treating" and "treatment" includes the reduction or inhibition of enzyme or protein activity related to arginase or in a subject, amelioration of one or more symptoms of a cancer, or the slowing or delaying of progression of cancer in a subject. The language "treat," "treating" and "treatment" also includes the reduction or inhibition of the growth of a tumor or proliferation of cancerous cells in a subject.

EXAMPLES

Aspects of the present disclosure can be further defined by reference to the following non-limiting examples, which describe in detail preparation of certain compounds and intermediates of the present disclosure and methods for using compounds of the present disclosure. It will be apparent to those skilled in the art that many modifications, both to materials and methods, can be practiced without departing from the scope of the present disclosure.

Unless stated otherwise:

(i) all syntheses were carried out at ambient temperature, i.e. in the range 17 to 25° C. and under an atmosphere of an inert gas such as nitrogen unless otherwise stated;

(ii) evaporations were carried out by rotary evaporation or utilising Genevac equipment or Biotage v10 evaporator in vacuo and work-up procedures were carried out after removal of residual solids by filtration;

(iii) flash chromatography purifications were performed on an automated Teledyne Isco CombiFlash® Rf or Teledyne Isco CombiFlash® Companion® using prepacked RediSep Rf Gold™ Silica Columns (20-40 µm, spherical particles), GraceResolv™ Cartridges (Davisil® silica) or Silicycle cartridges (40-63 µm).

(iv) preparative chromatography was performed on a Gilson prep HPLC instrument with UV collection; alternatively, preparative chromatography was performed on a Waters AutoPurification HPLC-MS instrument with MS- and UV-triggered collection;

(v) chiral preparative chromatography was performed on a Gilson instrument with UV collection (233 injector/fraction collector, 333 & 334 pumps, 155 UV detector) or a Varian Prep Star instrument (2×SD1 pumps, 325 UV detector, 701 fraction collector) pump running with Gilson 305 injection; alternatively, chiral preparative chromatography was performed on a Waters Prep 100 SFC-MS instrument with MS- and UV-triggered collection or a Thar MultiGram III SFC instrument with UV collection.

(vi) yields, where present, are not necessarily the maximum attainable;

(vii) in general, the structures of end-products of the Formula I were confirmed by nuclear magnetic resonance (NMR) spectroscopy; NMR chemical shift values were measured on the delta scale [proton magnetic resonance spectra were determined using a Bruker Avance III 600 (600 MHz), Bruker Avance 400 (400 MHz), Bruker Avance 300 (300 MHz) or Bruker DRX 500 (500 MHz) instrument]; measurements were taken at ambient temperature unless otherwise specified; the following abbreviations have been used: s, singlet; d, doublet; t, triplet; q, quartet; m, multiplet; dd, doublet of doublets; ddd, doublet of doublet of doublet; dt, doublet of triplets; bs, broad signal.

(viii) in general, end-products of the Formula I were also characterized by mass spectroscopy following liquid chromatography (LCMS or UPLC); UPLC was carried out using a Waters UPLC fitted with a Waters SQ mass spectrometer (Column temp 40° C., UV=220-300 nm or 190-400 nm, Mass Spec=ESI with positive/negative switching) at a flow rate of 1 mL/min using a solvent system of 97% A+3% B to 3% A+97% B over 1.50 min (total run time with equilibration back to starting conditions, etc., 1.70 min), where A=0.1% formic acid or 0.05% trifluoroacetic acid in water (for acidic work) or 0.1% ammonium hydroxide in water (for basic work) and B=acetonitrile. For acidic analysis the column used was a Waters Acquity HSS T3 (1.8 µm, 2.1×50 mm), for basic analysis the column used was a Waters Acquity BEH C18 (1.7 µm 2.1×50 mm). Alternatively, UPLC was carried out using a Waters UPLC fitted with a Waters SQ mass spectrometer (Column temp 30° C., UV=210-400 nm, Mass Spec=ESI with positive/negative switching) at a flow rate of 1 mL/min using a solvent gradient of 2 to 98% B over 1.5 mins (total run time with equilibration back to starting conditions 2 min), where A=0.1% formic acid in water and B=0.1% formic acid in acetonitrile (for acidic work) or A=0.1% ammonium hydroxide in water and B=acetonitrile (for basic work). For acidic analysis the column used was a Waters Acquity HSS T3 (1.8 µm, 2.1×30 mm), for basic analysis the column used was a Waters Acquity BEH C18 (1.7 µm, 2.1×30 mm); LCMS was carried out using a Waters Alliance HT (2795) fitted with a Waters ZQ ESCi mass spectrometer and a Phenomenex Gemini-NX C18 (5 µm, 110 A, 2.1×50 mm column at a flow rate of 1.1 mL/min 95% A to 95% B over 4 min with a 0.5 min hold where A=0.1% formic acid and B=0.1% formic acid in acetonitrile (for acidic work) or A=0.1% ammonium hydroxide in water and B=acetonitrile (for basic work). Additionally, LCMS was carried out using a Shimadzu UFLC fitted with a Shimadzu LCMS-2020 mass spectrometer and a Waters HSS C18 (1.8 µm, 2.1×50 mm) or Shim-pack XR-ODS (2.2 µm, 3.0×50 mm) or Phenomenex Gemini-NX C18 (3 µm, 3.0×50 mm) column at a flowrate of 0.7 mL/min (for Waters HSS C18 column), 1.0 mL/min (for Shim-pack XR-ODS column) or 1.2 mL/min (for Phenomenex Gemini-NX C18), 95% A to 95% B over 2.2 min with a 0.6 min hold, where A=0.1% formic acid or 0.05% trifluoroacetic acid in water (for acidic work) or 0.1% ammonium hydroxide or 6.5 mM ammonium carbonate in water (for basic work) and B=acetonitrile. The reported molecular ion corresponds to the [M+H]+ unless otherwise specified; for molecules with multiple isotopic patterns (Br, Cl, etc.) the reported value is the one obtained for the lowest isotope mass unless otherwise specified.

(ix) ion exchange purification was generally performed using an SCX-2 (Biotage) cartridge.

(x) intermediate purity was assessed by thin layer chromatographic, mass spectroscopy, LCMS, UPLC/MS, HPLC (high performance liquid chromatography) and/or NMR analysis;

(xi) the following abbreviations have been used:—

EtOH: ethanol

EtOAc: ethyl acetate

LDA: lithium diisopropylamide

MeOH: methanol

TFA: trifluoroacetic acid

MeCN: acetonitrile

LCMS: liquid chromatography-mass spectrometry rt or RT: room temperature aq: aqueous THF: tetrahydrofuran KHMDS: potassium bis(trimethylsilyl)amide DCM: dichloromethane DMF: dimethylformamide HATU: (1-[Bis(dimethylamino)methylene]-1H-1,2,3-triazolo[4,5-b]pyridinium 3-oxid hexafluorophosphate)

BOC: tert-butoxycarbonyl

DTNB: 5,5'-dithiobis(2-nitrobenzoic acid

TNB: 2-nitro-5-thiobenzoic acid

HEPES: (4-(2-hydroxyethyl)-1-piperazineethanesulfonic acid)

Example 1: (2R,4S)-4-amino-2-(4-boronobutyl) piperidine-2-carboxylic acid

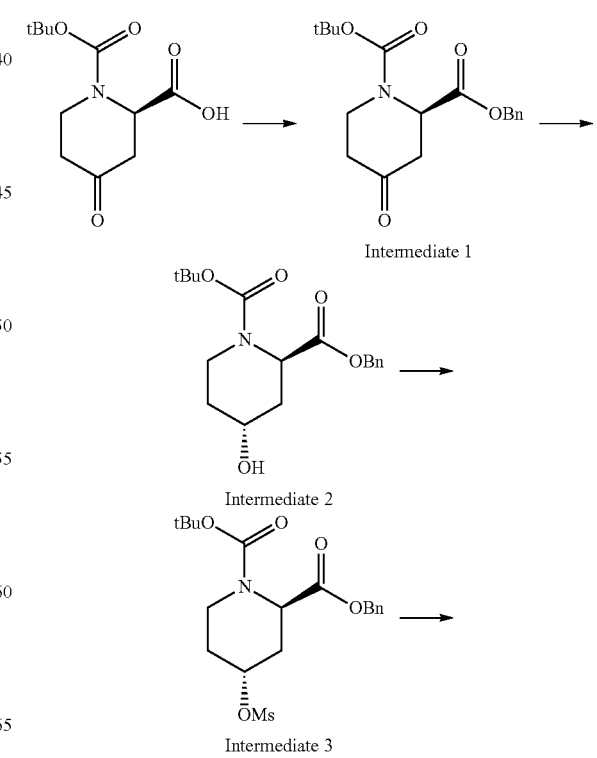

Intermediate 1

Intermediate 2

Intermediate 3

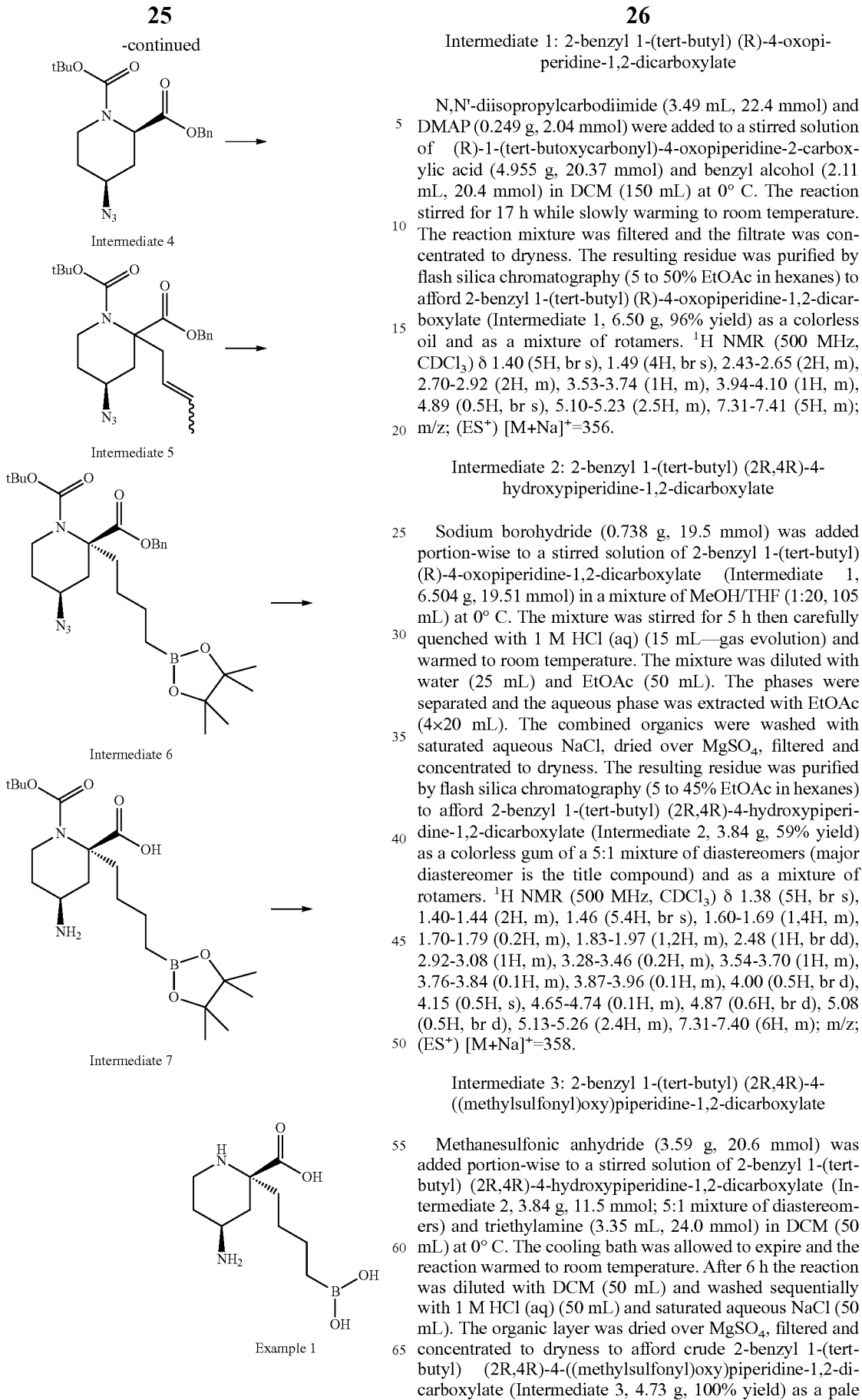

Intermediate 1: 2-benzyl 1-(tert-butyl) (R)-4-oxopiperidine-1,2-dicarboxylate

N,N'-diisopropylcarbodiimide (3.49 mL, 22.4 mmol) and DMAP (0.249 g, 2.04 mmol) were added to a stirred solution of (R)-1-(tert-butoxycarbonyl)-4-oxopiperidine-2-carboxylic acid (4.955 g, 20.37 mmol) and benzyl alcohol (2.11 mL, 20.4 mmol) in DCM (150 mL) at 0° C. The reaction stirred for 17 h while slowly warming to room temperature. The reaction mixture was filtered and the filtrate was concentrated to dryness. The resulting residue was purified by flash silica chromatography (5 to 50% EtOAc in hexanes) to afford 2-benzyl 1-(tert-butyl) (R)-4-oxopiperidine-1,2-dicarboxylate (Intermediate 1, 6.50 g, 96% yield) as a colorless oil and as a mixture of rotamers. $^1$H NMR (500 MHz, CDCl$_3$) δ 1.40 (5H, br s), 1.49 (4H, br s), 2.43-2.65 (2H, m), 2.70-2.92 (2H, m), 3.53-3.74 (1H, m), 3.94-4.10 (1H, m), 4.89 (0.5H, br s), 5.10-5.23 (2.5H, m), 7.31-7.41 (5H, m); m/z; (ES$^+$) [M+Na]$^+$=356.

Intermediate 2: 2-benzyl 1-(tert-butyl) (2R,4R)-4-hydroxypiperidine-1,2-dicarboxylate Sodium borohydride (0.738 g, 19.5 mmol) was added portion-wise to a stirred solution of 2-benzyl 1-(tert-butyl) (R)-4-oxopiperidine-1,2-dicarboxylate (Intermediate 1, 6.504 g, 19.51 mmol) in a mixture of MeOH/THF (1:20, 105 mL) at 0° C. The mixture was stirred for 5 h then carefully quenched with 1 M HCl (aq) (15 mL—gas evolution) and warmed to room temperature. The mixture was diluted with water (25 mL) and EtOAc (50 mL). The phases were separated and the aqueous phase was extracted with EtOAc (4×20 mL). The combined organics were washed with saturated aqueous NaCl, dried over MgSO$_4$, filtered and concentrated to dryness. The resulting residue was purified by flash silica chromatography (5 to 45% EtOAc in hexanes) to afford 2-benzyl 1-(tert-butyl) (2R,4R)-4-hydroxypiperidine-1,2-dicarboxylate (Intermediate 2, 3.84 g, 59% yield) as a colorless gum of a 5:1 mixture of diastereomers (major diastereomer is the title compound) and as a mixture of rotamers. $^1$H NMR (500 MHz, CDCl$_3$) δ 1.38 (5H, br s), 1.40-1.44 (2H, m), 1.46 (5.4H, br s), 1.60-1.69 (1,4H, m), 1.70-1.79 (0.2H, m), 1.83-1.97 (1,2H, m), 2.48 (1H, br dd), 2.92-3.08 (1H, m), 3.28-3.46 (0.2H, m), 3.54-3.70 (1H, m), 3.76-3.84 (0.1H, m), 3.87-3.96 (0.1H, m), 4.00 (0.5H, br d), 4.15 (0.5H, s), 4.65-4.74 (0.1H, m), 4.87 (0.6H, br d), 5.08 (0.5H, br d), 5.13-5.26 (2.4H, m), 7.31-7.40 (6H, m); m/z; (ES$^+$) [M+Na]$^+$=358.

Intermediate 3: 2-benzyl 1-(tert-butyl) (2R,4R)-4-((methylsulfonyl)oxy)piperidine-1,2-dicarboxylate Methanesulfonic anhydride (3.59 g, 20.6 mmol) was added portion-wise to a stirred solution of 2-benzyl 1-(tert-butyl) (2R,4R)-4-hydroxypiperidine-1,2-dicarboxylate (Intermediate 2, 3.84 g, 11.5 mmol; 5:1 mixture of diastereomers) and triethylamine (3.35 mL, 24.0 mmol) in DCM (50 mL) at 0° C. The cooling bath was allowed to expire and the reaction warmed to room temperature. After 6 h the reaction was diluted with DCM (50 mL) and washed sequentially with 1 M HCl (aq) (50 mL) and saturated aqueous NaCl (50 mL). The organic layer was dried over MgSO$_4$, filtered and concentrated to dryness to afford crude 2-benzyl 1-(tert-butyl) (2R,4R)-4-((methylsulfonyl)oxy)piperidine-1,2-dicarboxylate (Intermediate 3, 4.73 g, 100% yield) as a pale orange gum and a mixture of diastereomers. The crude material was used directly without further purification, m/z; (ES$^+$) [M+Na]$^+$=436.

Intermediate 4: 2-benzyl 1-(tert-butyl) (2R,4S)-4-azidopiperidine-1,2-dicarboxylate Sodium azide (3.72 g, 57.2 mmol) was added to a stirred solution of 2-benzyl 1-(tert-butyl) (2R,4R)-4-((methylsulfonyl)oxy)piperidine-1,2-dicarboxylate (Intermediate 3, 4.73 g, 11.4 mmol; mixture of diastereomers) in DMF (50 mL) and the reaction was warmed to 60° C. for 20 h. The mixture was allowed to cool to room temperature, filtered and the filtrate was diluted with water (400 mL) and EtOAc (40 mL). The phases were separated and the aqueous phase was extracted with EtOAc (4×40 mL). The combined organics were washed with saturated aqueous NaCl (2×40 mL), dried over MgSO$_4$, filtered and concentrated to dryness. The resulting residue was purified by flash silica chromatography (5 to 30% EtOAc in hexanes) to afford diastereomerically pure 2-benzyl 1-(tert-butyl) (2R,4S)-4-azidopiperidine-1,2-dicarboxylate (Intermediate 4, 2.58 g, 63% yield) as a colorless gum and a mixture of rotamers. $^1$H NMR (500 MHz, CDCl$_3$) δ 1.39 (4H, br s), 1.46 (5H, br s), 1.63-1.73 (1H, m), 1.74-1.87 (1H, m), 1.95 (1H, ddd), 2.50-2.61 (1H, m), 3.03-3.44 (1H, m), 3.73-3.89 (0.5H, m), 3.90-4.01 (1.5H, m), 4.58-4.74 (0.5H, m), 4.88 (0.5H, br s), 5.15-5.34 (2H, m), 7.30-7.43 (5H, m); m/z; (ES$^+$) [M-Boc]$^+$=261.

Intermediate 5: 2-benzyl 1-(tert-butyl) (4S)-4-azido-2-(but-2-en-1-yl)piperidine-1,2-dicarboxylate 2-Benzyl 1-(tert-butyl) (2R,4S)-4-azidopiperidine-1,2-dicarboxylate (Intermediate 4, 1.94 g, 5.38 mmol) and crotyl bromide (0.977 mL, 8.07 mmol) were dissolved in THF (30 mL) and the solution was cooled to −78° C. A solution of KHMDS (1 M in 2-methyltetrahydrofuran, 7.0 mL, 7.0 mmol) was added dropwise over 10 min. The reaction mixture was slowly warmed to room temperature and stirred for a total of 18 h. The crude reaction mixture was quenched with saturated aqueous NH$_4$Cl then diluted with saturated aqueous NaCl and EtOAc (50 mL). The phases were separated and the aqueous layer was extracted with EtOAc (3×30 mL). The combined organics were washed with saturated aqueous NaCl, dried over MgSO$_4$, filtered and concentrated to dryness. The resulting residue was purified by flash silica chromatography (2 to 30% EtOAc in hexanes) to afford 2-benzyl 1-(tert-butyl) (4S)-4-azido-2-(but-2-en-1-yl)piperidine-1,2-dicarboxylate (Intermediate 5, 2.106 g, 94% yield) as a syn/anti diastereomeric mixture and as a mixture of rotamers and E/Z olefins. $^1$H NMR (500 MHz, CD$_2$Cl$_2$) δ 1.40-1.42 (4H, m), 1.43 (5H, br s), 1.49-1.58 (1H, m), 1.59-1.66 (0.6H, m), 1.67-1.74 (3.4H, m), 1.86 (0.5H, dd), 1.89-2.05 (2H, m), 2.07-2.19 (1H, m), 2.42 (0.5H, dd), 2.58-2.69 (1H, m), 2.71-2.83 (0.5H, m), 3.01-3.16 (0.5H, m), 3.21 (0.5H, br dd), 3.31-3.44 (0.5H, m), 3.61-3.77 (1.5H, m), 3.97-4.07 (0.5H, m), 5.10-5.27 (2H, m), 5.36-5.45 (1H, m), 5.51-5.74 (2H, m), 7.32-7.47 (5H, m); m/z; (ES$^+$) [M-Boc]$^+$=315.

Intermediate 6: 2-benzyl 1-(tert-butyl) (2R,4S)-4-azido-2-(4-(4,4,5,5-tetramethyl-1,3,2-dioxaborolan-2-yl)butyl)piperidine-1,2-dicarboxylate Bis(1,5-cyclooctadiene)diiridium(I) dichloride (50 mg, 0.074 mmol) and bis(diphenylphosphino)methane (57 mg, 0.15 mmol) were added to an oven-dried round-bottom flask. The flask was sealed and purged with N$_2$. The solids were dissolved in DCM (9 mL) and 4,4,5,5-tetramethyl-1,3,2-dioxaborolane (0.32 mL, 2.2 mmol) was slowly added to the solution. The reaction was stirred at room temperature for 10 min. 2-benzyl 1-(tert-butyl) (4S)-4-azido-2-(but-2-en-1-yl)piperidine-1,2-dicarboxylate (Intermediate 5, 616 mg, 1.49 mmol) was added to the reaction as a solution in DCM (3 mL) and the reaction mixture stirred for 66 h at room temperature. The reaction mixture was cooled to 0° C. and carefully quenched with MeOH (1 mL) and water (5 mL). The layers were separated and the aqueous layer was extracted with DCM (3×15 mL). The combined organics were dried over MgSO$_4$, filtered and concentrated to dryness. The resulting residue was purified by flash silica chromatography (5 to 15% EtOAc in hexanes) to afford diastereomerically pure 2-benzyl 1-(tert-butyl) (2R,4S)-4-azido-2-(4-(4,4,5,5-tetramethyl-1,3,2-dioxaborolan-2-yl)butyl)piperidine-1,2-dicarboxylate (Intermediate 6, 261 mg, 32% yield) as a clear, colorless gum. $^1$H NMR (500 MHz, CDCl$_3$) δ 0.79 (2H, t), 1.25 (12H, s), 1.29-1.35 (1H, m), 1.36-1.39 (1H, m), 1.41 (9H, s), 1.42-1.46 (2H, m), 1.57-1.68 (1H, m), 1.85-1.94 (3H, m), 1.95-2.01 (1H, m), 2.05 (1H, dd), 2.92-3.11 (1H, m), 3.49-3.72 (1H, m), 3.98-4.03 (1H, m), 5.09 (1H, d), 5.18 (1H, d), 7.29-7.42 (5H, m); m/z; (ES$^+$) [M+Na]$^+$=565.

Intermediate 7: (2R,4S)-4-amino-1-(tert-butoxycarbonyl)-2-(4-(4,4,5,5-tetramethyl-1,3,2-dioxaborolan-2-yl)butyl)piperidine-2-carboxylic acid Pd/C (10% wt, 50 mg, 0.047 mmol) was added to a solution of 2-benzyl 1-(tert-butyl) (2R,4S)-4-azido-2-(4-(4,4,5,5-tetramethyl-1,3,2-dioxaborolan-2-yl)butyl)piperidine-1,2-dicarboxylate (Intermediate 6, 268 mg 0.494 mmol) in EtOAc (3 mL). The suspension was stirred under a hydrogen atmosphere (balloon, flask evacuated and back-filled with hydrogen ×3) at room temperature for 17 h. The reaction mixture was diluted with MeOH (5 mL), filtered through diatomaceous earth and concentrated to dryness. The resulting residue was purified by flash silica chromatography (5 to 45% MeOH in DCM) to afford (2R,4S)-4-amino-1-(tert-butoxycarbonyl)-2-(4-(4,4,5,5-tetramethyl-1,3,2-dioxaborolan-2-yl)butyl)piperidine-2-carboxylic acid (Intermediate 7, 156 mg, 74% yield) as a white dry film. $^1$H NMR (500 MHz, CD$_2$Cl$_2$) δ 0.71 (2H, t), 1.07-1.16 (1H, m), 1.19 (14H, s), 1.31-1.37 (2H, m), 1.40 (9H, s), 1.80-1.96 (1H, m), 2.02 (3H, br d), 2.33 (1H, br s), 3.00 (1H, br s), 3.53 (1H, br s), 3.92 (1H, br s), 8.60 (3H, br s); m/z; (ES$^+$) [M+H]$^+$=427.

Example 1: (2R,4S)-4-amino-2-(4-boronobutyl)piperidine-2-carboxylic acid

Trifluoroacetic acid (0.53 mL, 6.9 mmol) was added dropwise to a stirred solution of (2R,4S)-4-amino-1-(tert-butoxycarbonyl)-2-(4-(4,4,5,5-tetramethyl-1,3,2-dioxaborolan-2-yl)butyl)piperidine-2-carboxylic acid (Intermediate 7, 146 mg, 0.342 mmol) in DCM (2 mL) at room temperature. After 2 h the solution was concentrated under reduced pressure and the resulting residue was dissolved in 1 M HCl (aq) (3.0 mL, 3.0 mmol) and Et$_2$O (3 mL). Phenylboronic acid (125 mg, 1.03 mmol) was added and the clear biphasic solution stirred at room temperature for 4 h. The mixture was diluted with Et$_2$O (20 mL) and water (5 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2R,4S)-4-amino-2-(4-boronobutyl)piperidine-2-carboxylic acid (62 mg, 74% yield) as a white solid. ¹H NMR (500 MHz, D₂O) δ 0.71-0.82 (2H, m), 1.10-1.30 (2H, m), 1.33-1.44 (2H, m), 1.45-1.55 (1H, m), 1.62 (1H, dd), 1.77 (1H, ddd), 1.84-1.93 (1H, m), 2.01-2.08 (1H, m), 2.18 (1H, ddd), 3.07 (1H, td), 3.22 (1H, dt), 3.28-3.39 (1H, m); m/z; (ES⁺) [M+H]⁺=245.

Example 2: (2R,4S)-4-((S)-2-amino-3-methylbutanamido)-2-(4-boronobutyl)piperidine-2-carboxylic acid

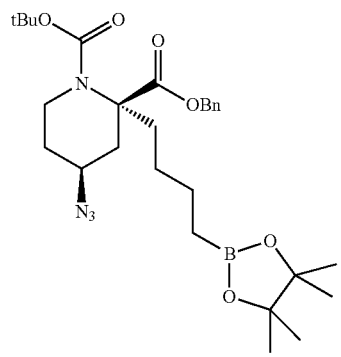

Intermediate 6

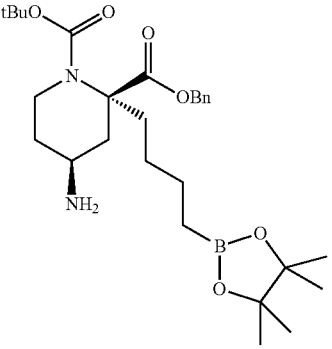

Intermediate 8

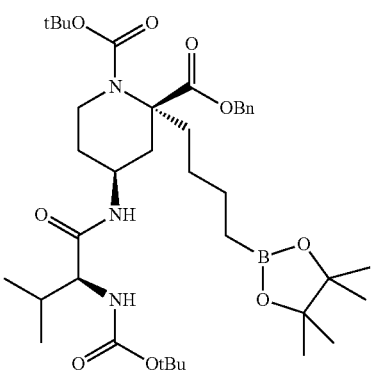

Intermediate 9

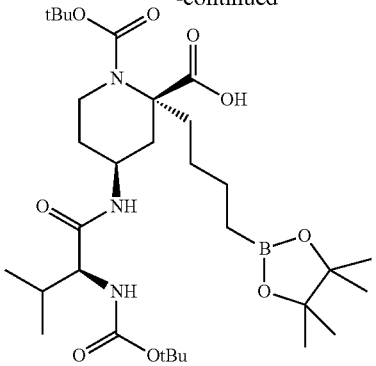

Intermediate 10

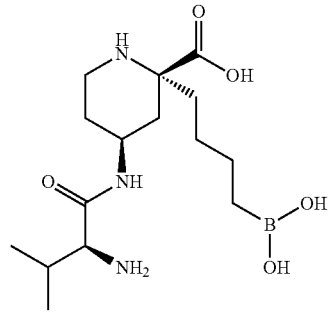

Example 2

Intermediate 8: 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate Zinc (270 mg, 4.14 mmol) and AcOH (1.20 mL, 20.9 mmol) were added to a stirred solution of 2-benzyl 1-(tert-butyl) (2R,4S)-4-azido-2-(4-(4,4,5,5-tetramethyl-1,3,2-dioxaborolan-2-yl)butyl)piperidine-1,2-dicarboxylate (Intermediate 6, 748 mg, 1.38 mmol) in THF (10 mL). The rapidly stirred mixture was heated to 30° C. for 18 h. The mixture was cooled to room temperature, diluted with DCM (30 mL) and filtered through diatomaceous earth. The filter cake was washed with DCM and the filtrate was concentrated to dryness. The resulting residue was partitioned between EtOAc (40 mL) and saturated aqueous NaHCO₃. The phases were separated and the organics were washed with saturated aqueous NaHCO₃ and saturated aqueous NaCl. The organics were dried over MgSO₄, filtered, and concentrated to dryness to afford 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 713 mg, 100% yield) as a clear colorless gum. The crude material was used directly without further purification. ¹H NMR (500 MHz, CDCl₃) δ 0.79 (2H, t), 1.24 (12H, s), 1.32-1.38 (2H, m), 1.39-1.47 (13H, m), 1.68 (2H, br t), 1.83-1.99 (4H, m), 2.93 (1H, td), 2.97-3.07 (1H, m), 3.96-4.10 (1H, m), 5.06-5.23 (2H, m), 7.30-7.41 (5H, m); m/z; (ES⁺) [M+H]⁺=517.

Intermediate 9: 2-benzyl 1-(tert-butyl) (2R,4S)-4-((S)-2-((tert-butoxycarbonyl)amino)-3-methylbutanamido)-2-(4-(4,4,5,5-tetramethyl-1,3,2-dioxaborolan-2-yl)butyl)piperidine-1,2-dicarboxylate N,N-Diisopropylethylamine (0.12 mL, 0.63 mmol) was added slowly to a stirred solution of COMU (270 mg, 0.63 mmol) and Boc-Val-OH (137 mg, 0.631 mmol) in DMF (2 mL) at room temperature. The solution stirred at room temperature for 30 min and was then cooled to 0° C. A solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 310 mg, 0.60 mmol) in DMF (2 mL) and N,N-Diisopropylethylamine (0.10 mL, 0.60 mmol) were added and the reaction stirred for 17 h while slowly warming to room temperature. The reaction mixture was diluted with water (40 mL) and the resulting precipitate was collected by filtration. The solid was dissolved in EtOAc, dried over MgSO$_4$, filtered and concentrated to dryness. The resulting residue was purified by flash silica chromatography (10 to 100% EtOAc in hexanes) to afford 2-benzyl 1-(tert-butyl) (2R,4S)-4-((S)-2-((tert-butoxycarbonyl)amino)-3-methylbutanamido)-2-(4-(4,4,5,5-tetramethyl-1,3,2-dioxaborolan-2-yl)butyl)piperidine-1,2-dicarboxylate (Intermediate 9, 184 mg, 43% yield) as a colorless film and as a mixture of rotamers. $^1$H NMR (500 MHz, CDCl$_3$) δ 0.73-0.80 (2H, m), 0.85 (3H, d), 0.89 (3H, d), 1.22 (12H, br s), 1.23-1.29 (2H, m), 1.37-1.45 (20H, m), 1.62-1.74 (1H, m), 1.86-1.99 (3H, m), 2.00-2.12 (3H, m), 2.97 (1H, t), 3.78 (1H, t), 3.94-4.06 (1H, m), 4.07-4.14 (1H, m), 5.00 (1H, br s), 5.05-5.24 (2H, m), 6.05 (1H, br d), 7.28-7.36 (5H, m); m/z; (ES$^+$) [M+H]$^+$=716.

Intermediate 10: (2R,4S)-1-(tert-butoxycarbonyl)-4-((S)-2-((tert-butoxycarbonyl)amino)-3-methylbutanamido)-2-(4-(4,4,5,5-tetramethyl-1,3,2-dioxaborolan-2-yl)butyl)piperidine-2-carboxylic acid Pd/C (10% wt, 27 mg, 0.025 mmol) was added to a solution of 2-benzyl 1-(tert-butyl) (2R,4S)-4-((S)-2-((tert-butoxycarbonyl)amino)-3-methylbutanamido)-2-(4-(4,4,5,5-tetramethyl-1,3,2-dioxaborolan-2-yl)butyl)piperidine-1,2-dicarboxylate (Intermediate 9, 184 mg, 0.257 mmol) in EtOAc (2 mL). The suspension was stirred under a hydrogen atmosphere (balloon, flask evacuated and back-filled with hydrogen ×3) at room temperature for 16 h. The reaction mixture was diluted with EtOAc (20 mL) and MeOH (20 mL), filtered through diatomaceous earth and concentrated to dryness. The resulting residue was purified by flash silica chromatography (20 to 100% EtOAc in hexanes followed by 10% MeOH in DCM) to afford (2R,4S)-1-(tert-butoxycarbonyl)-4-((S)-2-((tert-butoxycarbonyl)amino)-3-methylbutanamido)-2-(4-(4,4,5,5-tetramethyl-1,3,2-dioxaborolan-2-yl)butyl)piperidine-2-carboxylic acid (Intermediate 10, 116 mg, 72% yield) as a white solid and as a mixture of rotamers. $^1$H NMR (500 MHz, CDCl$_3$) δ 0.78 (3H, br d), 0.83-0.91 (2H, m), 0.94 (3H, br d), 1.20-1.25 (12H, m), 1.40 (9H, br s), 1.42-1.53 (11H, m), 1.51-1.66 (1H, m), 1.75-2.18 (4H, m), 2.19-2.34 (1H, m), 2.88-3.06 (1H, m), 3.85-4.06 (2H, m), 4.07-4.26 (1H, m), 5.14 (1H, br s), 5.93 (1H, br s), 6.73 (1H, br s), 7.30-7.48 (1H, m); m/z; (ES$^+$) [M+H]$^+$=627.

Example 2: (2R,4S)-4-((S)-2-amino-3-methylbutanamido)-2-(4-boronobutyl)piperidine-2-carboxylic acid Trifluoroacetic acid (0.433 mL, 5.63 mmol) was added dropwise to a stirred solution of (2R,4S)-1-(tert-butoxycarbonyl)-4-((S)-2-((tert-butoxycarbonyl)amino)-3-methylbutanamido)-2-(4-(4,4,5,5-tetramethyl-1,3,2-dioxaborolan-2-yl)butyl)piperidine-2-carboxylic acid (Intermediate 10, 176 mg, 0.281 mmol) in DCM (2 mL) at room temperature. After 3 h the solution was concentrated under reduced pressure and the resulting residue was dissolved in 1 M HCl (aq) (3.0 mL, 3.0 mmol) and Et$_2$O (3 mL). Phenylboronic acid (103 mg, 0.845 mmol) was added and the clear biphasic solution stirred at room temperature for 4 h. The mixture was diluted with Et$_2$O (20 mL) and water (5 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2R,4S)-4-((S)-2-amino-3-methylbutanamido)-2-(4-boronobutyl)piperidine-2-carboxylic acid (Example 2, 89 mg, 92% yield) as a white solid. $^1$H NMR (500 MHz, D$_2$O) δ 0.73-0.83 (2H, m), 0.88-0.96 (6H, m), 1.14-1.24 (1H, m), 1.25-1.35 (1H, m), 1.37-1.50 (2H, m), 1.64-1.76 (1H, m), 1.79-1.99 (4H, m), 2.01-2.09 (1H, m), 2.17 (1H, dd), 3.11 (1H, d), 3.16-3.24 (1H, m), 3.31 (1H, dt), 4.10-4.22 (1H, m); m/z; (ES$^+$) [M+H]$^+$=344.

Example 3: (2R,4S)-4-(2-aminoacetamido)-2-(4-boronobutyl)piperidine-2-carboxylic acid

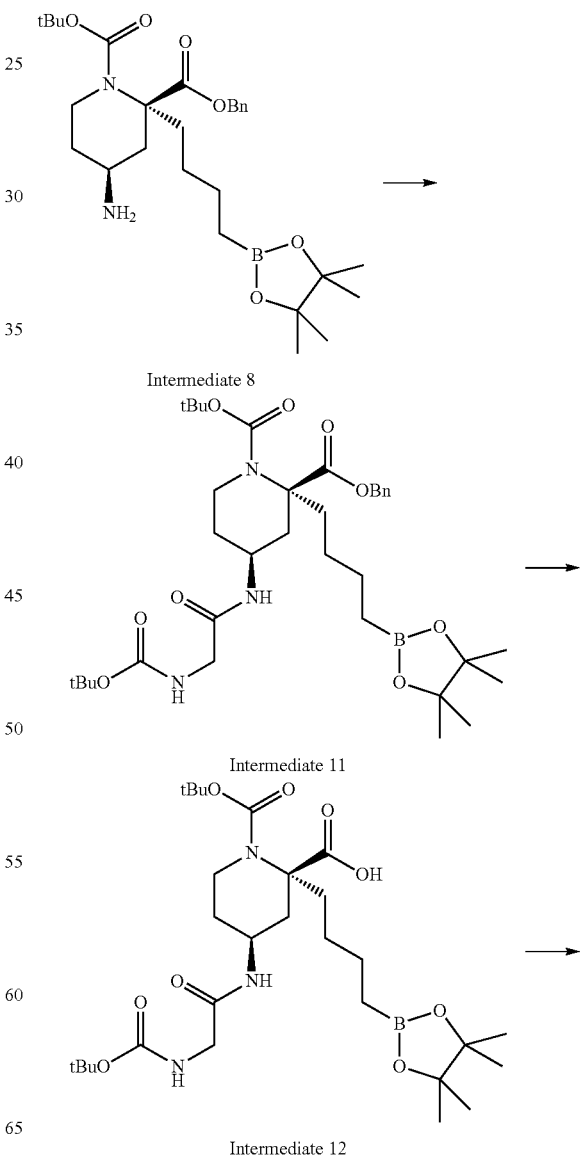

Intermediate 8

Intermediate 11

Intermediate 12

-continued

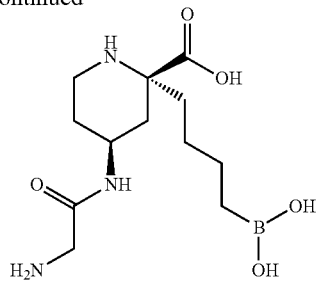

Example 3

Intermediate 11: 2-benzyl 1-(tert-butyl) (2R,4S)-4-(2-((tert-butoxycarbonyl)amino)acetamido)-2-(4-(4,4,5,5-tetramethyl-1,3,2-dioxaborolan-2-yl)butyl)piperidine-1,2-dicarboxylate N,N-Diisopropylethylamine (0.12 mL, 0.63 mmol) was added slowly to a stirred solution of COMU (270 mg, 0.63 mmol) and Boc-Gly-OH (110 mg, 0.63 mmol) in DMF (2 mL) at room temperature. The solution stirred at room temperature for 30 min and was then cooled to 0° C. A solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 310 mg, 0.60 mmol) in DMF (2 mL) and N,N-Diisopropylethylamine (0.11 mL, 0.60 mmol) were added and the reaction stirred for 17 h while slowly warming to room temperature. The reaction mixture was diluted with water (60 mL) and the pH was adjusted to ~5 with acetic acid. The aqueous phase was extracted with EtOAc (4×15 mL). The combined organics were washed with saturated aqueous NaCl (2×10 mL), dried over MgSO$_4$, filtered and concentrated to dryness The resulting residue was purified by flash silica chromatography (10 to 100% EtOAc in hexanes) to afford 2-benzyl 1-(tert-butyl) (2R,4S)-4-(2-((tert-butoxycarbonyl)amino)acetamido)-2-(4-(4,4,5,5-tetramethyl-1,3,2-dioxaborolan-2-yl)butyl)piperidine-1,2-dicarboxylate (Intermediate 11,204 mg, 51% yield) as a colorless film and as a mixture of rotamers. $^1$H NMR (500 MHz, CDCl$_3$) δ 0.75 (2H, br t), 1.21 (14H, s), 1.24 (2H, br d), 1.38 (9H, s), 1.40 (10H, s), 1.71 (1H, dd), 1.81-1.91 (1H, m), 1.93-2.04 (3H, m), 2.86-3.04 (1H, m), 3.62 (2H, br s), 3.93-4.04 (1H, m), 4.06-4.15 (1H, m), 5.11 (2H, s), 5.14 (1H, br s), 6.27 (1H, br s), 7.28-7.40 (5H, m); m/z; (ES$^+$) [M+H]$^+$=674.

Intermediate 12: (2R,4S)-1-(tert-butoxycarbonyl)-4-(2-((tert-butoxycarbonyl)amino)acetamido)-2-(4-(4,4,5,5-tetramethyl-1,3,2-dioxaborolan-2-yl)butyl)piperidine-2-carboxylic acid Pd/C (10% wt, 32 mg, 0.030 mmol) was added to a solution of 2-benzyl 1-(tert-butyl) (2R,4S)-4-(2-((tert-butoxycarbonyl)amino)acetamido)-2-(4-(4,4,5,5-tetramethyl-1,3,2-dioxaborolan-2-yl)butyl)piperidine-1,2-dicarboxylate (Intermediate 11,204 mg, 0.303 mmol) in EtOAc (2 mL). The suspension was stirred under a hydrogen atmosphere (balloon, flask evacuated and back-filled with hydrogen ×3) at room temperature for 16 h. The reaction mixture was diluted with EtOAc (20 mL) and MeOH (20 mL), filtered through diatomaceous earth and the filtrate was concentrated to dryness. The resulting residue was purified by flash silica chromatography (25 to 100% EtOAc in hexanes) to afford (2R,4S)-1-(tert-butoxycarbonyl)-4-(2-((tert-butoxycarbonyl)amino)acetamido)-2-(4-(4,4,5,5-tetramethyl-1,3,2-dioxaborolan-2-yl)butyl)piperidine-2-carboxylic acid (Intermediate 12, 117 mg, 66% yield) as a white solid and as a mixture of rotamers. $^1$H NMR (500 MHz, CDCl$_3$) δ 0.78 (2H, t), 1.17-1.29 (13H, m), 1.40 (10H, br s), 1.45 (9H, s), 1.48-1.57 (2H, m), 1.76-2.01 (3H, m), 2.04-2.13 (1H, m), 2.98 (1H, br t), 3.47-3.66 (1H, m), 3.75 (1H, s), 3.90-4.06 (2H, m), 4.13-4.25 (1H, m), 5.41 (1H, br s), 5.92 (1H, br s), 6.73 (1H, br s), 7.65 (1H, br s); m/z; (ES$^+$) [M+H]$^+$=584.

Example 3: (2R,4S)-4-(2-aminoacetamido)-2-(4-boronobutyl)piperidine-2-carboxylic acid Trifluoroacetic acid (0.31 mL, 4.0 mmol) was added dropwise to a stirred solution of (2R,4S)-1-(tert-butoxycarbonyl)-4-(2-((tert-butoxycarbonyl)amino)acetamido)-2-(4-(4,4,5,5-tetramethyl-1,3,2-dioxaborolan-2-yl)butyl)piperidine-2-carboxylic acid (Intermediate 12, 117 mg, 0.201 mmol) in DCM (2 mL) at room temperature. After 3 h the solution was concentrated under reduced pressure and the resulting residue was dissolved in 1 M HCl (aq) (3.0 mL, 3.0 mmol) and Et$_2$O (3 mL). Phenylboronic acid (73 mg, 0.60 mmol) was added and the clear biphasic solution stirred at room temperature for 4 h. The mixture was diluted with Et$_2$O (20 mL) and water (5 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2R,4S)-4-(2-aminoacetamido)-2-(4-boronobutyl)piperidine-2-carboxylic acid (Example 3, 61 mg, 100% yield) as a white solid. $^1$H NMR (500 MHz, D$_2$O) δ 0.72-0.84 (2H, m), 1.14-1.25 (1H, m), 1.26-1.34 (1H, m), 1.41 (2H, quin), 1.72 (1H, dtd), 1.79-1.94 (2H, m), 1.96-2.08 (2H, m), 2.10 (1H, dd), 3.14-3.25 (1H, m), 3.30-3.36 (1H, m), 3.37 (2H, s), 4.08-4.19 (1H, m); m/z; (ES$^+$) [M+H]$^+$=302.

Example 4: (2R,4S)-4-[[(2S)-2-aminopropanoyl]amino]-2-(4-boronobutyl)piperidine-2-carboxylic acid

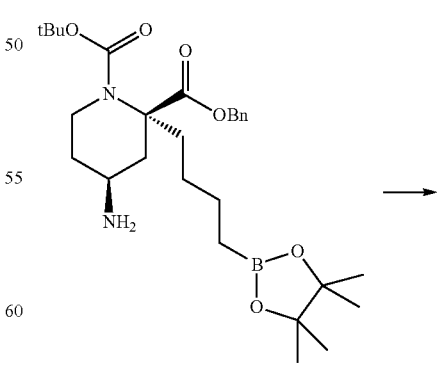

Intermediate 8

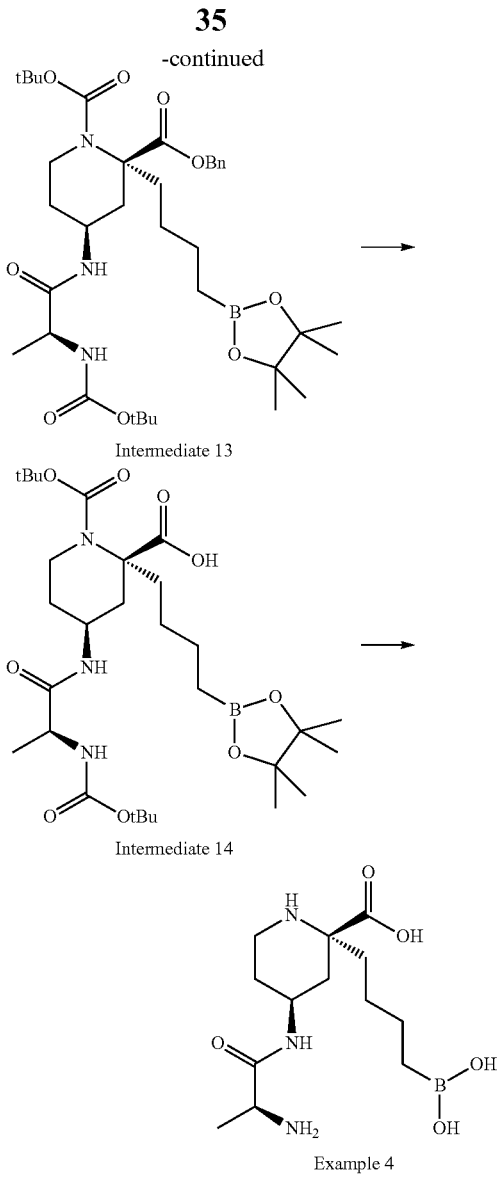

Intermediate 13

Intermediate 14

Example 4

Intermediate 13: 2-benzyl 1-tert-butyl (2R,4S)-4-[[(2S)-2-(tert-butoxycarbonylamino)propanoyl]amino]-2-[4-(4,4,5,5-tetramethyl-1,3,2-dioxaborolan-2-yl)butyl]piperidine-1,2-dicarboxylate N,N-Diisopropylethylamine (0.17 mL, 1.0 mmol) was added slowly to a stirred solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 245 mg, 0.474 mmol), Boc-Ala-OH (108 mg, 0.571 mmol) and COMU (244 mg, 0.571 mmol) in DMF (1.5 mL) at 0° C. The reaction stirred for 1.5 h while slowly warming to room temperature. The reaction mixture was diluted with water (20 mL) and EtOAc (20 mL) and the phases were separated. The aqueous phase was extracted with EtOAc (3×20 mL) and the combined organics were washed with saturated aqueous NaCl, dried over MgSO$_4$, filtered and concentrated to dryness. The resulting residue was purified by flash silica chromatography (15 to 80% EtOAc in hexanes) to afford 2-benzyl 1-tert-butyl (2R,4S)-4-[[(2S)-2-(tert-butoxycarbonylamino)propanoyl]amino]-2-[4-(4,4,5, 5-tetramethyl-1,3,2-dioxaborolan-2-yl)butyl]piperidine-1,2-dicarboxylate (Intermediate 13, 191 mg, 59% yield) as a pale-yellow gum and as a mixture of rotamers. $^1$H NMR (500 MHz, CDCl$_3$) δ 0.69-0.83 (2H, m), 1.22 (12H, d), 1.26 (5H, td), 1.38 (9H, br s), 1.40 (9H, br d), 1.42-1.49 (3H, m), 1.57-1.73 (1H, m), 1.83-1.98 (3H, m), 2.01-2.05 (2H, m), 2.91-3.03 (1H, m), 4.02 (2H, br s), 4.96 (1H, br s), 5.05-5.22 (2H, m), 6.21 (1H, br s), 7.27-7.36 (5H, m); m/z; (ES$^+$) [M+H]$^+$=688.

Intermediate 14: (2R,4S)-1-tert-butoxycarbonyl-4-[[(2S)-2-(tert-butoxycarbonylamino)propanoyl]amino]-2-[4-(4,4,5,5-tetramethyl-1,3,2-dioxaborolan-2-yl)butyl]piperidine-2-carboxylic acid Pd/C (10% wt, 15 mg, 0.014 mmol) was added to a solution of 2-benzyl 1-tert-butyl (2R,4S)-4-[[(2S)-2-(tert-butoxycarbonylamino)propanoyl]amino]-2-[4-(4,4,5,5-tetramethyl-1,3,2-dioxaborolan-2-yl)butyl]piperidine-1,2-dicarboxylate (Intermediate 13, 190 mg, 0.28 mmol) in EtOAc (2 mL). The suspension was stirred under a hydrogen atmosphere (balloon, flask evacuated and back-filled with hydrogen ×3) at room temperature for 17 h. The reaction mixture was diluted with EtOAc (15 mL) and MeOH (2 mL), filtered through diatomaceous earth and concentrated to dryness. The resulting residue was purified by flash silica chromatography (20 to 100% EtOAc in hexanes) to afford (2R,4S)-1-tert-butoxycarbonyl-4-[[(2S)-2-(tert-butoxycarbonylamino)propanoyl]amino]-2-[4-(4,4,5,5-tetramethyl-1,3,2-dioxaborolan-2-yl)butyl]piperidine-2-carboxylic acid (Intermediate 14, 134 mg, 81% yield) as a dry film and as a mixture of rotamers. $^1$H NMR (500 MHz, CDCl$_3$) δ 0.78 (2H, br t), 1.20-1.25 (12H, m), 1.29-1.36 (5H, m), 1.41 (9H, s), 1.44 (11H, s), 1.48-1.62 (2H, m), 1.77-2.01 (3H, m), 2.09 (2H, br s), 2.97 (1H, br s), 3.92-4.05 (1H, m), 5.07 (1H, br s), 5.48 (1H, br s), 6.71 (1H, br s), 7.61 (1H, br s); m/z; (ES$^+$) [M+H]$^+$=598.

Example 4: (2R,4S)-4-[[(2S)-2-aminopropanoyl]amino]-2-(4-boronobutyl)piperidine-2-carboxylic acid Trifluoroacetic acid (0.34 mL, 4.4 mmol) was added dropwise to a stirred solution of (2R,4S)-1-tert-butoxycarbonyl-4-[[(2S)-2-(tert-butoxycarbonylamino)propanoyl]amino]-2-[4-(4,4,5,5-tetramethyl-1,3,2-dioxaborolan-2-yl)butyl]piperidine-2-carboxylic acid (Intermediate 14, 130 mg, 0.22 mmol) in DCM (1 mL) at room temperature. After 3 h the solution was concentrated under reduced pressure and the resulting residue was dissolved in 1 M HCl (aq) (2.0 mL, 2.0 mmol) and Et$_2$O (2 mL). Phenylboronic acid (80 mg, 0.65 mmol) was added and the clear biphasic solution stirred at room temperature for 3 h. The mixture was diluted with Et$_2$O (20 mL) and water (5 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL). The obtained material was further purified by reverse phase chromatography (RediSep Rf Gold® C18, 0 to 15% acetonitrile in water) to afford (2R,4S)-4-[[(2S)-2-aminopropanoyl]amino]-2-(4-boronobutyl)piperidine-2-carboxylic acid (Example 4, 25 mg, 37% yield) as a white solid. $^1$H NMR (500 MHz, D$_2$O) δ 0.72-0.80 (2H, m), 1.12-1.23 (1H, m), 1.24-1.26 (1H, m), 1.27 (3H, d), 1.40 (2H, quin), 1.66-1.76 (1H, m), 1.78-1.92 (2H, m), 1.93-1.99 (1H, m), 2.00-2.06 (1H, m), 2.10 (1H, dd), 3.18 (1H, ddd), 3.27-3.36 (1H, m), 3.53 (1H, q), 4.10 (1H, tt); m/z; (ES⁺) [M+H]⁺=316.

Example 5: (2R,4S)-4-[[(2S)-2-aminobutanoyl]amino]-2-(4-boronobutyl)piperidine-2-carboxylic acid

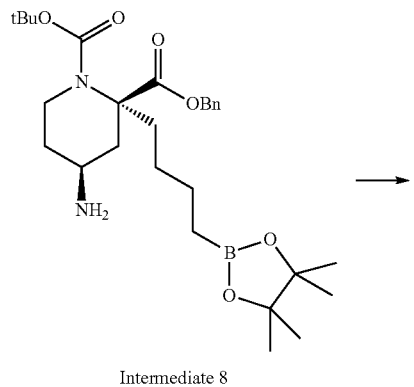

Intermediate 8

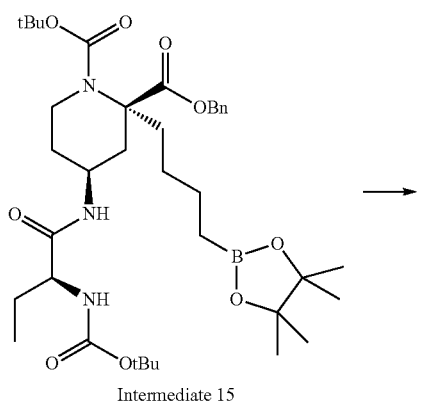

Intermediate 15

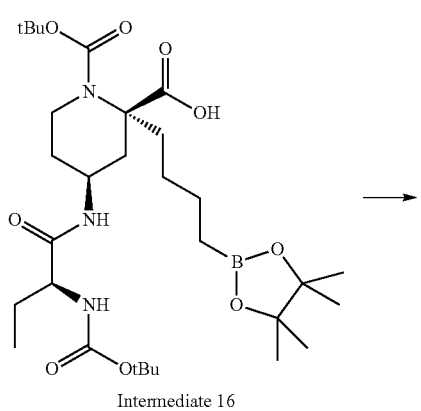

Intermediate 16

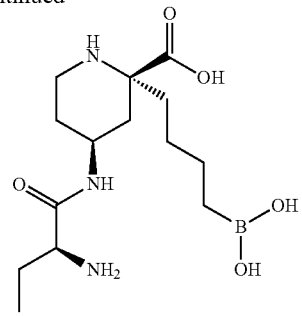

Example 5

Intermediate 15: 2-benzyl 1-(tert-butyl) (2R,4S)-4-((S)-2-((tert-butoxycarbonyl)amino)butanamido)-2-(4-(4,4,5,5-tetramethyl-1,3,2-dioxaborolan-2-yl)butyl)piperidine-1,2-dicarboxylate N,N-Diisopropylethylamine (0.165 mL, 0.94 mmol) was added slowly to a stirred solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 244 mg, 0.47 mmol), Boc-Abu-OH (96 mg, 0.47 mmol) and COMU (206 mg, 0.48 mmol) in DMF (3 mL) at 0° C. The reaction stirred for 16 h while slowly warming to room temperature. The crude reaction mixture was diluted with water (30 mL) and extracted with EtOAc (3×10 mL). The combined organics were washed sequentially with saturated aqueous NaHCO₃ (20 mL) and saturated aqueous NaCl (15 mL). The organic layer was dried over MgSO₄, filtered and concentrated to dryness. The resulting residue was purified by flash silica chromatography (15 to 60% EtOAc in hexanes) to afford 2-benzyl 1-(tert-butyl) (2R,4S)-4-((S)-2-((tert-butoxycarbonyl)amino)butanamido)-2-(4-(4,4,5,5-tetramethyl-1,3,2-dioxaborolan-2-yl)butyl)piperidine-1,2-dicarboxylate (Intermediate 15, 215 mg, 65% yield) as clear gum and as a mixture of rotamers. ¹H NMR (500 MHz, CDCl₃) δ 0.71-0.79 (2H, m), 0.87 (3H, br t), 1.19 (4H, br s), 1.21 (9H, s), 1.36 (5H, br s), 1.38 (8H, s), 1.39-1.41 (8H, m), 1.48-1.58 (2H, m), 1.68 (1H, br dd), 1.72-1.81 (1H, m), 1.84-1.98 (3H, m), 1.99-2.02 (1H, m), 2.88-3.04 (1H, m), 3.89 (1H, br d), 3.95-4.07 (2H, m), 5.00 (1H, br d), 5.05-5.22 (2H, m), 6.20 (1H, br s), 7.27-7.36 (5H, m); m/z; (ES⁺) [M+H]⁺=703.

Intermediate 16: (2R,4S)-1-(tert-butoxycarbonyl)-4-((S)-2-((tert-butoxycarbonyl)amino)butanamido)-2-(4-(4,4,5,5-tetramethyl-1,3,2-dioxaborolan-2-yl)butyl)piperidine-2-carboxylic acid Pd/C (10% wt, 16 mg, 0.015 mmol) was added to a solution of 2-benzyl 1-(tert-butyl) (2R,4S)-4-((S)-2-((tert-butoxycarbonyl)amino)butanamido)-2-(4-(4,4,5,5-tetramethyl-1,3,2-dioxaborolan-2-yl)butyl)piperidine-1,2-dicarboxylate (Intermediate 15, 215 mg, 0.31 mmol) in EtOAc (3 mL). The suspension was stirred under a hydrogen atmosphere (balloon, flask evacuated and back-filled with hydrogen ×3) at room temperature for 24 h. The reaction mixture was diluted with EtOAc (10 mL) and MeOH (1 mL), filtered through diatomaceous earth and concentrated to dryness. The resulting residue was purified by flash silica chromatography (5 to 100% EtOAc in hexanes) to afford (2R,4S)-1-(tert-butoxycarbonyl)-4-((S)-2-((tert-butoxycarbonyl)

amino)butanamido)-2-(4-(4,4,5,5-tetramethyl-1,3,2-dioxaborolan-2-yl)butyl)piperidine-2-carboxylic acid (Intermediate 16, 147 mg, 78% yield) as a dry film and a mixture of rotamers. $^1$H NMR (500 MHz, CDCl$_3$) δ 0.75 (2H, br s), 0.89 (3H, br s), 1.20 (12H, s), 1.24-1.33 (2H, m), 1.37 (10H, br s), 1.40 (10H, s), 1.42-1.61 (4H, m), 1.85 (3H, br s), 1.98 (2H, br s), 2.01-2.06 (1H, m), 2.95 (1H, br s), 3.98 (2H, br s), 5.27 (0.5H, br s), 5.68 (0.5H, br s), 6.74 (0.5H, br s), 7.52 (0.5H, br s); m/z; (ES$^+$) [M+H]$^+$=612.

Example 5: (2R,4S)-4-[[(2S)-2-aminobutanoyl]amino]-2-(4-boronobutyl)piperidine-2-carboxylic acid Trifluoroacetic acid (0.37 mL, 4.8 mmol) was added dropwise to a stirred solution of (2R,4S)-1-(tert-butoxycarbonyl)-4-((S)-2-((tert-butoxycarbonyl)amino)butanamido)-2-(4-(4,4,5,5-tetramethyl-1,3,2-dioxaborolan-2-yl)butyl)piperidine-2-carboxylic acid (Intermediate 16, 147 mg, 0.24 mmol) in DCM (1 mL) at room temperature. After 2 h the solution was concentrated under reduced pressure and the resulting residue was dissolved in 1 M HCl (aq) (2.0 mL, 2.0 mmol) and Et$_2$O (2 mL). Phenylboronic acid (88 mg, 0.72 mmol) was added and the clear biphasic solution stirred at room temperature for 4 h. The mixture was diluted with Et$_2$O (5 mL) and water (2 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL). The obtained material was further purified by reverse phase chromatography (RediSep Rf Gold® C18, 0 to 15% acetonitrile in water) to afford (2R,4S)-4-[[(2S)-2-aminobutanoyl]amino]-2-(4-boronobutyl)piperidine-2-carboxylic acid (Example 5, 37 mg, 47% yield) as a white solid. $^1$H NMR (500 MHz, D$_2$O) δ 0.76 (2H, br t), 0.87 (3H, t), 1.13-1.23 (1H, m), 1.24-1.34 (1H, m), 1.40 (2H, quin), 1.63 (2H, dq), 1.67-1.74 (1H, m), 1.78-1.85 (1H, m), 1.86-1.96 (2H, m), 1.99-2.07 (1H, m), 2.13 (1H, brdd), 3.10-3.24 (1H, m), 3.25-3.41 (2H, m), 4.07-4.21 (1H, m); m/z; (ES$^+$) [M+H]$^+$=330.

Example 6: (2R,4S)-4-[[(2S)-2-amino-4-methylpentanoyl]amino]-2-(4-boronobutyl)piperidine-2-carboxylic acid

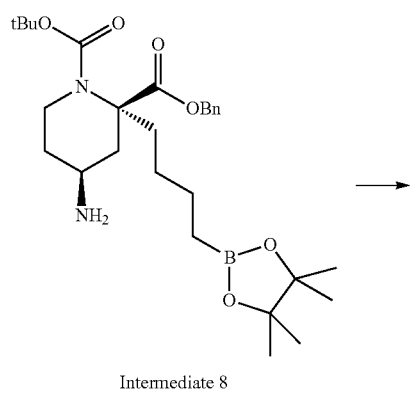

Intermediate 8

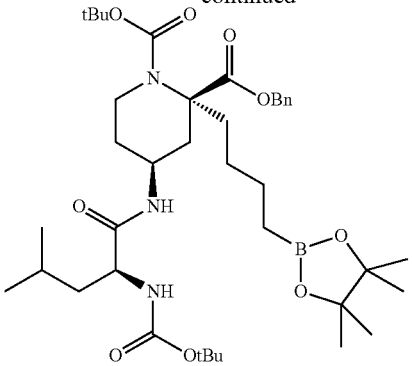

Intermediate 17

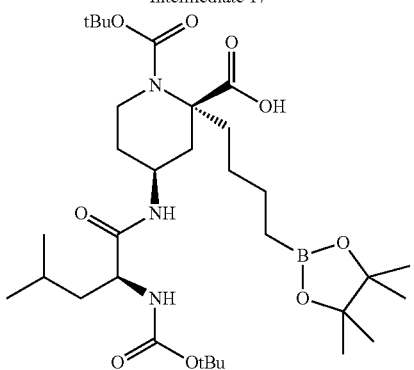

Intermediate 18

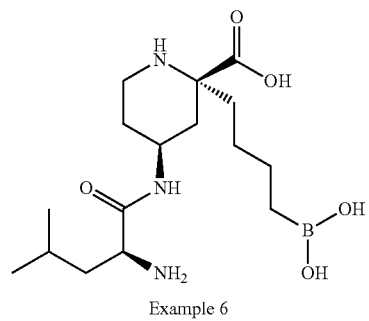

Example 6

Intermediate 17: 2-benzyl 1-(tert-butyl) (2R,4S)-4-((S)-2-((tert-butoxycarbonyl)amino)-4-methylpentanamido)-2-(4-(4,4,5,5-tetramethyl-1,3,2-dioxaborolan-2-yl)butyl)piperidine-1,2-dicarboxylate N,N-Diisopropylethylamine (0.17 mL, 0.94 mmol) was added to a stirred solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 244 mg, 0.47 mmol), Boc-Leu-OH (96 mg, 0.47 mmol) and COMU (206 mg, 0.48 mmol) in DMF (3 mL) at 0° C. The reaction stirred for 16 h while slowly warming to room temperature. The crude reaction mixture was diluted with water (30 mL) and extracted with EtOAc (3×10 mL). The combined organics were washed sequentially with saturated aqueous NaHCO$_3$ (20 mL) and saturated aqueous NaCl (15 mL). The organic layer was dried over MgSO$_4$, filtered and concentrated to dryness. The resulting residue was purified by flash silica chromatography (15 to 60% EtOAc in hexanes) to afford 2-benzyl 1-(tert-butyl) (2R,4S)-4-((S)-2-((tert-butoxycarbonyl)amino)-4-methylpentanamido)-2-(4-

(4,4,5,5-tetramethyl-1,3,2-dioxaborolan-2-yl)butyl)piperidine-1,2-dicarboxylate (Intermediate 17, 224 mg, 65% yield) as a white foam and as a mixture of rotamers. $^1$H NMR (500 MHz, CDCl$_3$) δ 0.73-0.80 (2H, m), 0.89 (3H, d), 0.90 (3H, d), 1.22 (12H, s), 1.27 (1H, br s), 1.39 (9H, s), 1.40 (9H, s), 1.41-1.48 (4H, m), 1.55-1.64 (2H, m), 1.68 (1H, br dd), 1.85-1.98 (3H, m), 2.01 (1H, br d), 2.02-2.05 (1H, m), 2.93-3.02 (1H, m), 3.94-4.08 (3H, m), 4.83 (1H, br d), 5.05-5.22 (2H, m), 6.20 (1H, br s), 7.28-7.31 (1H, m), 7.33 (4H, d); m/z; (ES$^+$) [M+H]$^+$=731.

Intermediate 18: (2R,4S)-1-(tert-butoxycarbonyl)-4-((S)-2-((tert-butoxycarbonyl)amino)-4-methylpentanamido)-2-(4-(4,4,5,5-tetramethyl-1,3,2-dioxaborolan-2-yl)butyl)piperidine-2-carboxylic acid Pd/C (10% wt, 13 mg, 0.012 mmol) was added to a solution of 2-benzyl 1-(tert-butyl) (2R,4S)-4-((S)-2-((tert-butoxycarbonyl)amino)-4-methylpentanamido)-2-(4-(4,4,5,5-tetramethyl-1,3,2-dioxaborolan-2-yl)butyl)piperidine-1,2-dicarboxylate (Intermediate 17, 174 mg, 0.24 mmol) in EtOAc (2.5 mL). The suspension was stirred under a hydrogen atmosphere (balloon, flask evacuated and back-filled with hydrogen ×3) at room temperature for 23 h. The reaction mixture was diluted with EtOAc (10 mL) and MeOH (1 mL), filtered through diatomaceous earth and concentrated to dryness. The resulting residue was purified by flash silica chromatography (15 to 100% EtOAc in hexanes) to afford (2R,4S)-1-(tert-butoxycarbonyl)-4-((S)-2-((tert-butoxycarbonyl)amino)-4-methylpentanamido)-2-(4-(4,4,5,5-tetramethyl-1,3,2-dioxaborolan-2-yl)butyl)piperidine-2-carboxylic acid (Intermediate 18, 149 mg, 98% yield) as a dry film and a mixture of rotamers. $^1$H NMR (500 MHz, CDCl$_3$) δ 0.78 (2H, br t), 0.91 (6H, brd), 1.23 (11H, s), 1.27-1.36 (2H, m), 1.40 (10H, s), 1.43 (11H, s), 1.46-1.55 (2H, m), 1.60-1.73 (2H, m), 1.78-1.96 (3H, m), 1.97-2.02 (1H, m), 2.05-2.14 (1H, m), 2.82-3.08 (1H, m), 3.92-4.08 (2H, m), 5.00 (0.4H, br s), 5.49 (0.6H, br d), 6.76 (0.4H, br d), 7.60 (0.6H, br s); m/z; (ES$^+$) [M+H]$^+$=640.

Example 6: (2R,4S)-4-[[(2S)-2-amino-4-methyl-pentanoyl]amino]-2-(4-boronobutyl)piperidine-2-carboxylic acid Trifluoroacetic acid (0.36 mL, 4.7 mmol) was added dropwise to a stirred solution of (2R,4S)-1-(tert-butoxycarbonyl)-4-((S)-2-((tert-butoxycarbonyl)amino)-4-methylpentanamido)-2-(4-(4,4,5,5-tetramethyl-1,3,2-dioxaborolan-2-yl)butyl)piperidine-2-carboxylic acid (Intermediate 18, 149 mg, 0.23 mmol) in DCM (1 mL) at room temperature. After 2 h the solution was concentrated under reduced pressure and the resulting residue was dissolved in 1 M HCl (aq) (2.0 mL, 2.0 mmol) and Et$_2$O (2 mL). Phenylboronic acid (85 mg, 0.70 mmol) was added and the clear biphasic solution stirred at room temperature for 4 h. The mixture was diluted with Et$_2$O (10 mL) and water (2 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2R,4S)-4-[[(2S)-2-amino-4-methyl-pentanoyl]amino]-2-(4-boronobutyl)piperidine-2-carboxylic acid (Example 6, 81 mg, 97% yield) as a white solid. $^1$H NMR (500 MHz, D$_2$O) δ 0.74-0.82 (2H, m), 0.89 (3H, d), 0.91 (3H, d), 1.15-1.25 (1H, m), 1.24-1.34 (1H, m), 1.38-1.47 (3H, m), 1.47-1.54 (1H, m), 1.60 (1H, dt), 1.65-1.76 (1H, m), 1.79-1.98 (3H, m), 2.01-2.09 (1H, m), 2.14 (1H, dd), 3.15-3.23 (1H, m), 3.31 (1H, dt), 3.39 (1H, t), 4.10-4.17 (1H, m); m/z; (ES$^+$) [M−H$_2$O+H]$^+$=340.

Example 7: (2R,4S)-4-[[(2S,3S)-2-amino-3-methyl-pentanoyl]amino]-2-(4-boronobutyl)piperidine-2-carboxylic acid

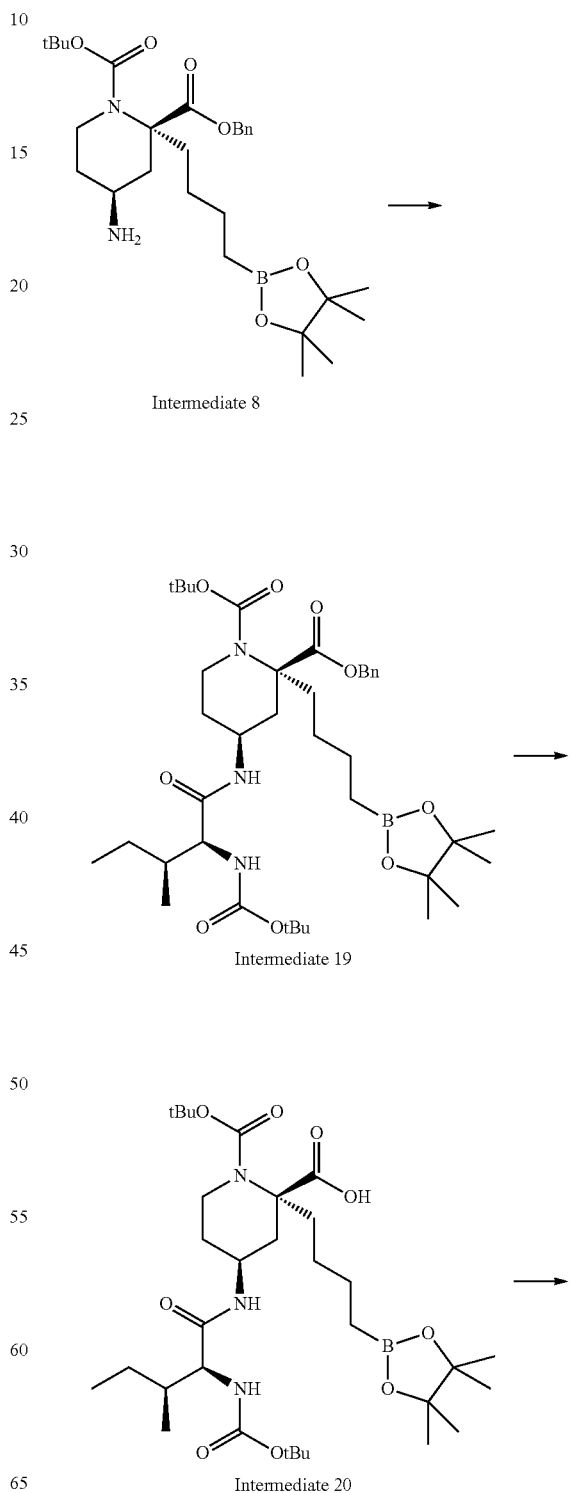

Intermediate 8

Intermediate 19

Intermediate 20

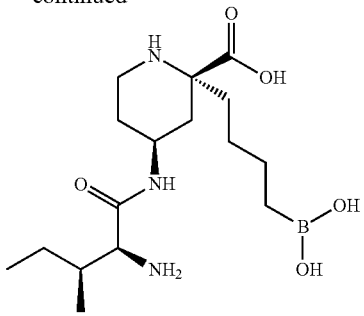

Example 7

Intermediate 19: 2-benzyl 1-(tert-butyl) (2R,4S)-4-((2S,3S)-2-((tert-butoxycarbonyl)amino)-3-methylpentanamido)-2-(4-(4,4,5,5-tetramethyl-1,3,2-dioxaborolan-2-yl)butyl)piperidine-1,2-dicarboxylate N,N-Diisopropylethylamine (0.24 mL, 1.4 mmol) was added slowly to a stirred solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 355 mg, 0.687 mmol), Boc-Ile-OH (159 mg, 0.687 mmol) and COMU (300 mg, 0.70 mmol) in DMF (4 mL) at 0° C. The reaction stirred for 16 h while slowly warming to room temperature. The crude reaction mixture was diluted with water (30 mL) and the mixture stirred for 10 min. The resulting precipitate was collected by filtration. The solid was dissolved in EtOAc (20 mL) and washed with saturated aqueous NaCl (5 mL), dried over MgSO$_4$, filtered and concentrated to dryness. The resulting residue was purified by flash silica chromatography (5 to 60% EtOAc in hexanes) to afford 2-benzyl 1-(tert-butyl) (2R,4S)-4-((2S,3S)-2-((tert-butoxycarbonyl)amino)-3-methylpentanamido)-2-(4-(4,4,5,5-tetramethyl-1,3,2-dioxaborolan-2-yl)butyl)piperidine-1,2-dicarboxylate (Intermediate 19, 424 mg, 85% yield) as a white foam and as a mixture of rotamers. $^1$H NMR (500 MHz, CDCl$_3$) δ 0.73-0.80 (2H, m), 0.82-0.90 (6H, m), 0.97-1.11 (1H, m), 1.21 (12H, s), 1.26-1.31 (1H, m), 1.32-1.36 (1H, m), 1.38 (9H, br s), 1.39 (9H, s), 1.41-1.43 (2H, m), 1.67 (1H, br dd), 1.75-1.84 (2H, m), 1.86-1.98 (3H, m), 2.00 (1H, br d), 2.03 (1H, br d), 2.92-3.02 (1H, m), 3.81 (1H, t), 3.95-4.09 (2H, m), 4.98 (1H, br s), 5.04-5.21 (2H, m), 6.07 (1H, br d), 7.28-7.36 (5H, m); m/z; (ES$^+$) [M+H]$^+$=730.

Intermediate 20: (2R,4S)-1-(tert-butoxycarbonyl)-4-((2S,3S)-2-((tert-butoxycarbonyl)amino)-3-methylpentanamido)-2-(4-(4,4,5,5-tetramethyl-1,3,2-dioxaborolan-2-yl)butyl)piperidine-2-carboxylic acid Pd/C (10% wt, 22 mg, 0.021 mmol) was added to a solution of 2-benzyl 1-(tert-butyl) (2R,4S)-4-((2S,3S)-2-((tert-butoxycarbonyl)amino)-3-methylpentanamido)-2-(4-(4,4,5,5-tetramethyl-1,3,2-dioxaborolan-2-yl)butyl)piperidine-1,2-dicarboxylate (Intermediate 19, 302 mg, 0.41 mmol) in EtOAc (4 mL). The suspension was stirred under a hydrogen atmosphere (balloon, flask evacuated and back-filled with hydrogen x3) at room temperature for 20 h. The reaction mixture was diluted with EtOAc (10 mL) and MeOH (1 mL), filtered through diatomaceous earth and concentrated to dryness. The resulting residue was purified by flash silica chromatography (15 to 100% EtOAc in hexanes followed by 0 to 50% MeOH in EtOAc) to afford (2R,4S)-1-(tert-butoxycarbonyl)-4-((2S,3S)-2-((tert-butoxycarbonyl)amino)-3-methylpentanamido)-2-(4-(4,4,5,5-tetramethyl-1,3,2-dioxaborolan-2-yl)butyl)piperidine-2-carboxylic acid (Intermediate 20, 223 mg, 84% yield) as a dry film and as a mixture of rotamers, and the boronic acid byproduct (2R,4S)-2-(4-boronobutyl)-1-(tert-butoxycarbonyl)-4-((2S,3S)-2-((tert-butoxycarbonyl)amino)-3-methylpentanamido)piperidine-2-carboxylic acid (30 mg, 13% yield) as a white solid and as a mixture or rotamers. Intermediate 20: $^1$H NMR (500 MHz, CDCl$_3$) δ 0.72-0.81 (2H, m), 0.82-0.88 (3H, m), 0.89-0.94 (3H, m), 0.98-1.11 (1H, m), 1.21-1.24 (12H, m), 1.26-1.31 (1H, m), 1.32-1.38 (2H, m), 1.40 (10H, br s), 1.42 (10H, br s), 1.45-1.55 (1H, m), 1.53-1.64 (1H, m), 1.76-1.97 (4H, m), 1.98-2.08 (3H, m), 2.83-3.10 (1H, m), 3.90-4.08 (2H, m), 5.15 (0.5H, brd), 5.81 (0.5H, br s), 6.74 (0.5H, br s), 7.48 (0.5H, br s); m/z; (ES$^+$) [M+H]$^+$=640. Boronic acid byproduct: $^1$H NMR (500 MHz, CDCl$_3$) δ 0.76-0.86 (2H, m), 0.86-0.96 (6H, m), 1.03-1.13 (1H, m), 1.43 (9H, br s), 1.44 (12H, s), 1.53-1.68 (1H, m), 1.78-1.90 (2H, m), 1.90-1.99 (2H, m), 1.99-2.04 (1H, m), 2.07-2.21 (1H, m), 2.98-3.11 (1H, m), 3.43-3.61 (1H, m), 3.90 (1H, br s), 3.96-4.12 (2H, m), 5.19 (1H, br s), 5.53-5.76 (1H, m), 6.72 (1H, br s); m/z; (ES$^+$) [M+H]$^+$=558.

Example 7: (2R,4S)-4-[[(2S,3S)-2-amino-3-methylpentanoyl]amino]-2-(4-boronobutyl)piperidine-2-carboxylic acid Trifluoroacetic acid (0.62 mL, 8.1 mmol) was added dropwise to a stirred solution of (2R,4S)-1-(tert-butoxycarbonyl)-4-((2S,3S)-2-((tert-butoxycarbonyl)amino)-3-methylpentanamido)-2-(4-(4,4,5,5-tetramethyl-1,3,2-dioxaborolan-2-yl)butyl)piperidine-2-carboxylic acid (Intermediate 20, 223 mg, 0.35 mmol) and the boronic acid byproduct (2RAS)-2-(4-boronobutyl)-1-(tert-butoxycarbonyl)-4-((2S,3S)-2-((tert-butoxycarbonyl)amino)-3-methylpentanamido)piperidine-2-carboxylic acid (30 mg, 0.05 mmol) in DCM (2 mL) at room temperature. After 2 h the solution was concentrated under reduced pressure and the resulting residue was dissolved in 1 M HCl (aq) (3.0 mL, 3.0 mmol) and Et$_2$O (3 mL). Phenylboronic acid (147 mg, 1.21 mmol) was added and the clear biphasic solution stirred at room temperature for 3 h. The mixture was diluted with Et$_2$O (5 mL) and water (1 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2R,4S)-4-[[(2S,3S)-2-amino-3-methylpentanoyl]amino]-2-(4-boronobutyl)piperidine-2-carboxylic acid (Example 7, 126 mg, 88% yield) as a white solid. $^1$H NMR (500 MHz, D$_2$O) δ 0.78 (2H, td), 0.85-0.91 (6H, m), 1.11-1.25 (2H, m), 1.26-1.34 (1H, m), 1.37-1.49 (3H, m), 1.64-1.76 (2H, m), 1.80-1.91 (2H, m), 1.92-1.99 (1H, m), 2.01-2.09 (1H, m), 2.17 (1H, dd), 3.15-3.24 (2H, m), 3.31 (1H, dt), 4.10-4.21 (1H, m); m/z; (ES$^+$) [M+H]$^+$=358.

Example 8: (2R,4S)-4-[[(2S)-2-amino-3,3-dimethyl-butanoyl]amino]-2-(4-boronobutyl)piperidine-2-carboxylic acid

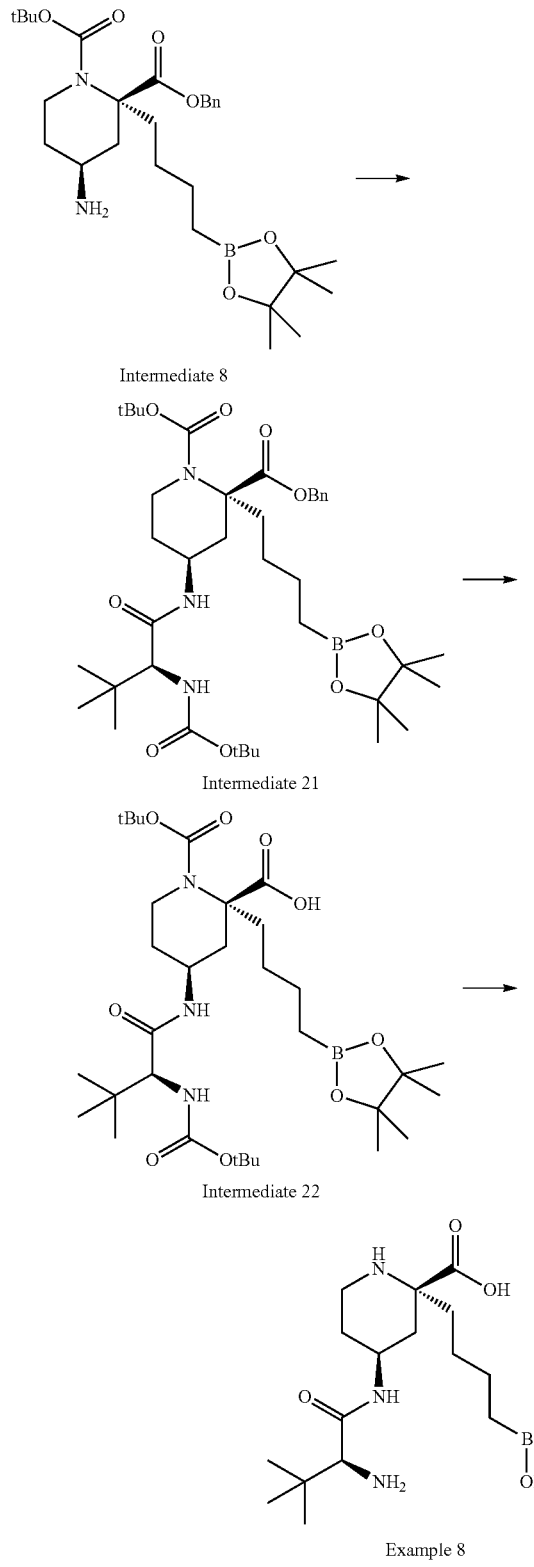

Intermediate 8

Intermediate 21

Intermediate 22

Example 8

Intermediate 21: 2-benzyl 1-(tert-butyl) (2R,4S)-4-((S)-2-((tert-butoxycarbonyl)amino)-3,3-dimethylbutanamido)-2-(4-(4,4,5,5-tetramethyl-1,3,2-dioxaborolan-2-yl)butyl)piperidine-1,2-dicarboxylate N,N-Diisopropylethylamine (0.24 mL, 1.4 mmol) was added slowly to a stirred solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 355 mg, 0.687 mmol), Boc-tert-Leu-OH (159 mg, 0.687 mmol) and COMU (300 mg, 0.70 mmol) in DMF (4 mL) at 0° C. The reaction stirred for 16 h while slowly warming to room temperature. The crude reaction mixture was diluted with water (30 mL) and the mixture stirred for 10 min. The resulting precipitate was collected by filtration. The solid was dissolved in EtOAc (20 mL) and washed with saturated aqueous NaCl (5 mL), dried over MgSO$_4$, filtered and concentrated to dryness. The resulting residue was purified by flash silica chromatography (5 to 55% EtOAc in hexanes) to afford 2-benzyl 1-(tert-butyl) (2R,4S)-4-((S)-2-((tert-butoxycarbonyl)amino)-3,3-dimethylbutanamido)-2-(4-(4,4,5,5-tetramethyl-1,3,2-dioxaborolan-2-yl)butyl)piperidine-1,2-dicarboxylate (Intermediate 21, 372 mg, 74% yield) as a white foam. $^1$H NMR (500 MHz, CDCl$_3$) δ 0.73-0.81 (2H, m), 0.95 (9H, s), 1.24 (12H, s), 1.41 (10H, s), 1.42-1.46 (12H, m), 1.68 (1H, dd), 1.87-1.95 (1H, m), 1.96-2.01 (2H, m), 2.02-2.05 (2H, m), 2.92-3.04 (1H, m), 3.69 (1H, br d), 3.98-4.12 (2H, m), 5.05-5.25 (3H, m), 5.50-5.62 (1H, m), 7.30-7.39 (5H, m); m/z; (ES$^+$) [M+H]$^+$=730.

Intermediate 22: (2R,4S)-1-(tert-butoxycarbonyl)-4-((S)-2-((tert-butoxycarbonyl)amino)-3,3-dimethylbutanamido)-2-(4-(4,4,5,5-tetramethyl-1,3,2-dioxaborolan-2-yl)butyl)piperidine-2-carboxylic acid Pd/C (10% wt, 27 mg, 0.025 mmol) was added to a solution of 2-benzyl 1-(tert-butyl) (2R,4S)-4-((S)-2-((tert-butoxycarbonyl)amino)-3,3-dimethylbutanamido)-2-(4-(4,4,5,5-tetramethyl-1,3,2-dioxaborolan-2-yl)butyl)piperidine-1,2-dicarboxylate (Intermediate 21, 372 mg, 0.511 mmol) in EtOAc (4 mL). The suspension was stirred under a hydrogen atmosphere (balloon, flask evacuated and back-filled with hydrogen ×3) at room temperature for 20 h. The reaction mixture was diluted with EtOAc (10 mL) and MeOH (1 mL), filtered through diatomaceous earth and concentrated to dryness. The resulting residue was purified by flash silica chromatography (40 to 100% EtOAc in hexanes followed by 0 to 40% MeOH in EtOAc) to afford (2R,4S)-1-(tert-butoxycarbonyl)-4-((S)-2-((tert-butoxycarbonyl)amino)-3,3-dimethylbutanamido)-2-(4-(4,4,5,5-tetramethyl-1,3,2-dioxaborolan-2-yl)butyl)piperidine-2-carboxylic acid (Intermediate 22, 265 mg, 81% yield) as a dry film and a mixture of rotamers, and the boronic acid byproduct (2R,4S)-2-(4-boronobutyl)-1-(tert-butoxycarbonyl)-4-((S)-2-((tert-butoxycarbonyl)amino)-3,3-dimethylbutanamido)piperidine-2-carboxylic acid (32 mg, 11% yield) as a clear dry film and as a mixture of rotamers. Intermediate 22: $^1$H NMR (500 MHz, CDCl$_3$) δ 0.75 (2H, br t), 0.93 (9H, s), 1.20 (12H, s), 1.24-1.33 (2H, m), 1.36 (9H, s), 1.38 (9H, br s), 1.40 (3H, br s), 1.51-1.64 (1H, m), 1.72-1.82 (1H, m), 1.83-1.98 (3H, m), 2.03 (1H, br s), 2.79-3.06 (1H, m), 3.76 (0.4H, br d), 3.85-4.07 (2.6H, m), 5.42 (0.6H, br d), 6.39-6.71 (1H, m), 6.74-6.99 (0.4H, m); m/z; (ES$^+$) [M+H]$^+$=640. Boronic acid byproduct: $^1$H NMR (500 MHz, CDCl$_3$) δ 0.77-0.86 (2H, m), 0.97 (9H, s), 1.42 (9H, br s), 1.43 (14H, br s), 1.52-1.67 (1H, m), 1.75-1.90 (2H, m), 1.91-2.04 (3H, m), 2.08-2.19

(1H, m), 2.97-3.14 (1H, m), 3.44-3.63 (1H, m), 3.87 (1H, br d), 3.97-4.11 (2H, m), 5.50 (1H, br s), 6.53-6.79 (1H, m); m/z; (ES$^+$) [M+H]$^+$=558.

Example 8: (2R,4S)-4-[[(2S)-2-amino-3,3-dimethyl-butanoyl]amino]-2-(4-boronobutyl)piperidine-2-carboxylic acid Trifluoroacetic acid (0.73 mL, 9.4 mmol) was added dropwise to a stirred solution of (2R,4S)-1-(tert-butoxycarbonyl)-4-((S)-2-((tert-butoxycarbonyl)amino)-3,3-dimethylbutanamido)-2-(4-(4,4,5,5-tetramethyl-1,3,2-dioxaborolan-2-yl)butyl)piperidine-2-carboxylic acid (Intermediate 22, 265 mg, 0.414 mmol) and the boronic acid byproduct (2R,4S)-2-(4-boronobutyl)-1-(tert-butoxycarbonyl)-4-((S)-2-((tert-butoxycarbonyl)amino)-3,3-dimethylbutanamido)piperidine-2-carboxylic acid (32 mg, 0.057 mmol) in DCM (2 mL) at room temperature. After 2 h the solution was concentrated under reduced pressure and the resulting residue was dissolved in 1 M HCl (aq) (3.0 mL, 3.0 mmol) and Et$_2$O (3 mL). Phenylboronic acid (172 mg, 1.41 mmol) was added and the clear biphasic solution stirred at room temperature for 4 h. The mixture was diluted with Et$_2$O (5 mL) and water (1 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2R,4S)-4-[[(2S)-2-amino-3,3-dimethyl-butanoyl]amino]-2-(4-boronobutyl)piperidine-2-carboxylic acid (Example 8, 158 mg, 94% yield) as a white solid. $^1$H NMR (500 MHz, D$_2$O) δ 0.74-0.81 (2H, m), 0.95 (9H, s), 1.15-1.25 (1H, m), 1.26-1.34 (1H, m), 1.38-1.48 (2H, m), 1.65-1.75 (1H, m), 1.80-1.91 (2H, m), 1.96 (1H, ddd), 2.01-2.10 (1H, m), 2.19 (1H, dd), 3.05 (1H, s), 3.15-3.24 (1H, m), 3.30 (1H, dt), 4.10-4.23 (1H, m); m/z; (ES$^+$) [M+H]$^+$=358.

Example 9: (2R,4S)-4-[[(2R)-2-amino-3-methyl-butanoyl]amino]-2-(4-boronobutyl)piperidine-2-carboxylic acid

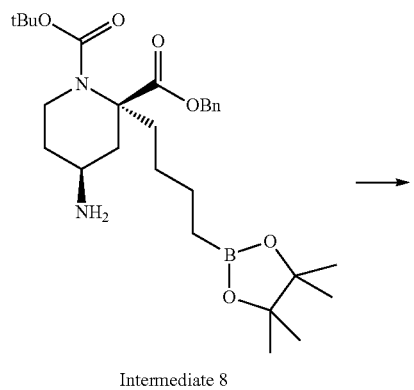

Intermediate 8

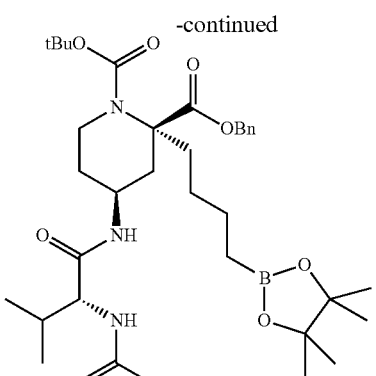

Intermediate 23

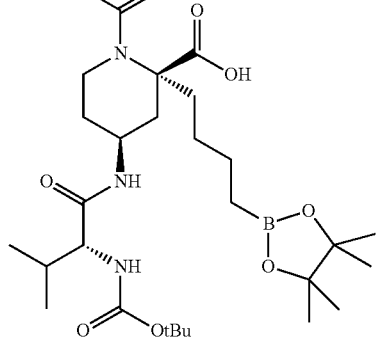

Intermediate 24

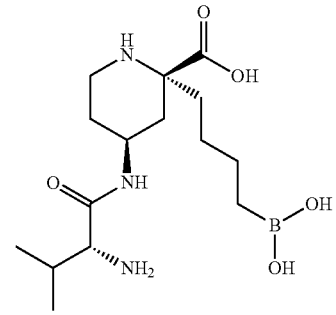

Example 9

Intermediate 23: 2-benzyl 1-(tert-butyl) (2R,4S)-4-((R)-2-((tert-butoxycarbonyl)amino)-3-methylbutanamido)-2-(4-(4,4,5,5-tetramethyl-1,3,2-dioxaborolan-2-yl)butyl)piperidine-1,2-dicarboxylate N,N-Diisopropylethylamine (0.063 mL, 0.36 mmol) was added slowly to a stirred solution of HATU (61 mg, 0.16 mmol) and Boc-D-Val-OH (33 mg, 0.15 mmol) in DMF (1 mL) at 0° C. The solution was stirred for 10 min then a solution of 2-benzyl 1-(tert-butyl) (2R,4S)-4-amino-2-(4-(4,4,5,5-tetramethyl-1,3,2-dioxaborolan-2-yl)butyl)piperidine-1,2-dicarboxylate (Intermediate 8, 75 mg, 0.15 mmol) in DMF (1 mL) was added. The reaction stirred for 16 h while slowly warming to room temperature. The crude reaction was diluted with 0.1 M HCl (aq) (30 mL) and EtOAc. The phases were separated and the aqueous phase was extracted with EtOAc (3×15 mL). The combined organics were washed with saturated aqueous NaCl, dried over MgSO$_4$, filtered and concentrated to dryness. The resulting residue was purified by flash silica chromatography (5 to 40%

EtOAc in hexanes) to afford 2-benzyl 1-(tert-butyl) (2R,4S)-4-((R)-2-((tert-butoxycarbonyl)amino)-3-methylbutanamido)-2-(4-(4,4,5,5-tetramethyl-1,3,2-dioxaborolan-2-yl)butyl)piperidine-1,2-dicarboxylate (Intermediate 23, 74 mg, 71% yield) as a colorless film and as a mixture of rotamers. $^1$H NMR (500 MHz, CDCl$_3$) δ 0.75 (2H, t), 0.84 (3H, d), 0.89 (3H, d), 1.21 (12H, s), 1.30-1.35 (1H, m), 1.37 (9H, s), 1.39 (9H, s), 1.42 (4H, br s), 1.69 (1H, dd), 1.81-1.91 (1H, m), 1.92-2.01 (3H, m), 2.02 (2H, s), 2.94-3.02 (1H, m), 3.75 (1H, dd), 3.91-4.03 (1H, m), 5.03-5.19 (3H, m), 6.10 (1H, d), 7.28-7.39 (5H, m); m/z; (ES$^+$) [M+H]$^+$=715.

Intermediate 24: (2R,4S)-1-(tert-butoxycarbonyl)-4-((R)-2-((tert-butoxycarbonyl)amino)-3-methylbutanamido)-2-(4-(4,4,5,5-tetramethyl-1,3,2-dioxaborolan-2-yl)butyl)piperidine-2-carboxylic acid Pd/C (10% wt, 5 mg, 0.005 mmol) was added to a solution of 2-benzyl 1-(tert-butyl) (2R,4S)-4-((R)-2-((tert-butoxycarbonyl)amino)-3-methylbutanamido)-2-(4-(4,4,5,5-tetramethyl-1,3,2-dioxaborolan-2-yl)butyl)piperidine-1,2-dicarboxylate (Intermediate 23, 69 mg, 0.10 mmol) in EtOAc (1 mL). The suspension was stirred under a hydrogen atmosphere (balloon, flask evacuated and back-filled with hydrogen ×3) at room temperature for 19 h. The reaction mixture was diluted with EtOAc (10 mL) and MeOH (1 mL), filtered through diatomaceous earth and concentrated to dryness. The resulting residue was purified by flash silica chromatography (40 to 100% EtOAc in hexanes then 0 to 40% MeOH in EtOAc) to afford (2R,4S)-1-(tert-butoxycarbonyl)-4-((R)-2-((tert-butoxycarbonyl)amino)-3-methylbutanamido)-2-(4-(4,4,5,5-tetramethyl-1,3,2-dioxaborolan-2-yl)butyl)piperidine-2-carboxylic acid (Intermediate 24, 40 mg, 66% yield) as a dry film and as a mixture of rotamers. $^1$H NMR (500 MHz, CDCl$_3$) δ 0.77 (2H, t), 0.91 (6H, brd), 1.20-1.24 (13H, m), 1.29 (1H, brd), 1.33-1.42 (11H, m), 1.43 (10H, s), 1.70-1.82 (1H, m), 1.83-1.90 (1H, m), 1.91-2.02 (4H, m), 3.00 (1H, t), 3.83-3.94 (1H, m), 3.96-4.07 (1H, m), 4.13 (1H, br s), 5.40 (1H, d), 6.03-6.33 (1H, m), 6.90-7.22 (1H, m); m/z; (ES$^+$) [M+H]$^+$=625.

Example 9: (2R,4S)-4-[[(2R)-2-amino-3-methylbutanoyl]amino]-2-(4-boronobutyl)piperidine-2-carboxylic acid Trifluoroacetic acid (0.10 mL, 1.3 mmol) was added dropwise to a stirred solution of (2R,4S)-1-(tert-butoxycarbonyl)-4-((R)-2-((tert-butoxycarbonyl)amino)-3-methylbutanamido)-2-(4-(4,4,5,5-tetramethyl-1,3,2-dioxaborolan-2-yl)butyl)piperidine-2-carboxylic acid (Intermediate 24, 40 mg, 0.06 mmol) in DCM (1 mL) at room temperature. After 2 h the solution was concentrated under reduced pressure and the resulting residue was dissolved in 1 M HCl (aq) (1.0 mL, 1.0 mmol) and Et$_2$O (1 mL). Phenylboronic acid (24 mg, 0.20 mmol) was added and the clear biphasic solution stirred at room temperature for 20 h. The mixture was diluted with Et$_2$O (5 mL) and water (1 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2R,4S)-4-[[(2R)-2-amino-3-methyl-butanoyl]amino]-2-(4-boronobutyl)piperidine-2-carboxylic acid (Example 9, 20 mg, 91% yield) as a white solid. $^1$H NMR (500 MHz, D$_2$O) δ 0.73-0.83 (2H, m), 0.87-0.95 (6H, m), 1.14-1.23 (1H, m), 1.24-1.33 (1H, m), 1.41 (2H, quin), 1.65-1.77 (1H, m), 1.79-1.87 (1H, m), 1.88-1.98 (3H, m), 2.01-2.09 (1H, m), 2.15 (1H, dd), 3.14 (1H, d), 3.15-3.24 (1H, m), 3.31 (1H, dt), 4.11-4.20 (1H, m); m/z; (ES$^+$) [M-H$_2$O+H]$^+$=326.

Example 10: Anti-4-amino-2-(4-boronobutyl)piperidine-2-carboxylic acid enantiomer 1

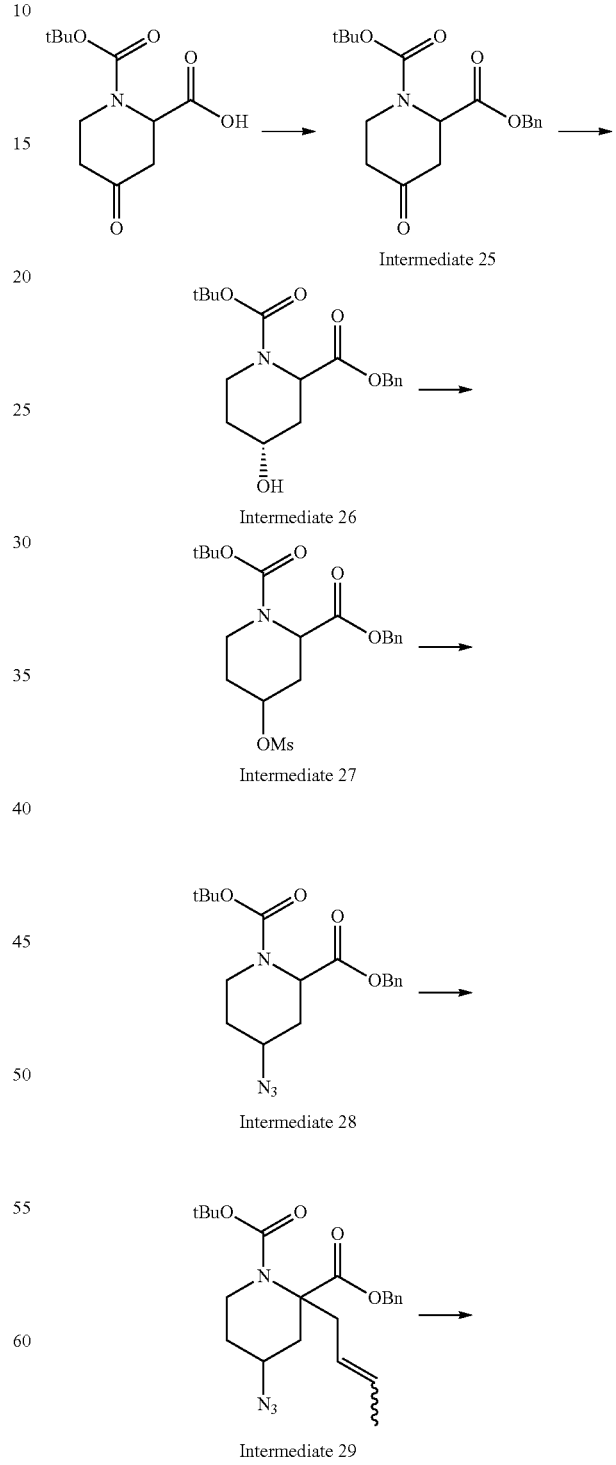

Intermediate 25

Intermediate 26

Intermediate 27

Intermediate 28

Intermediate 29

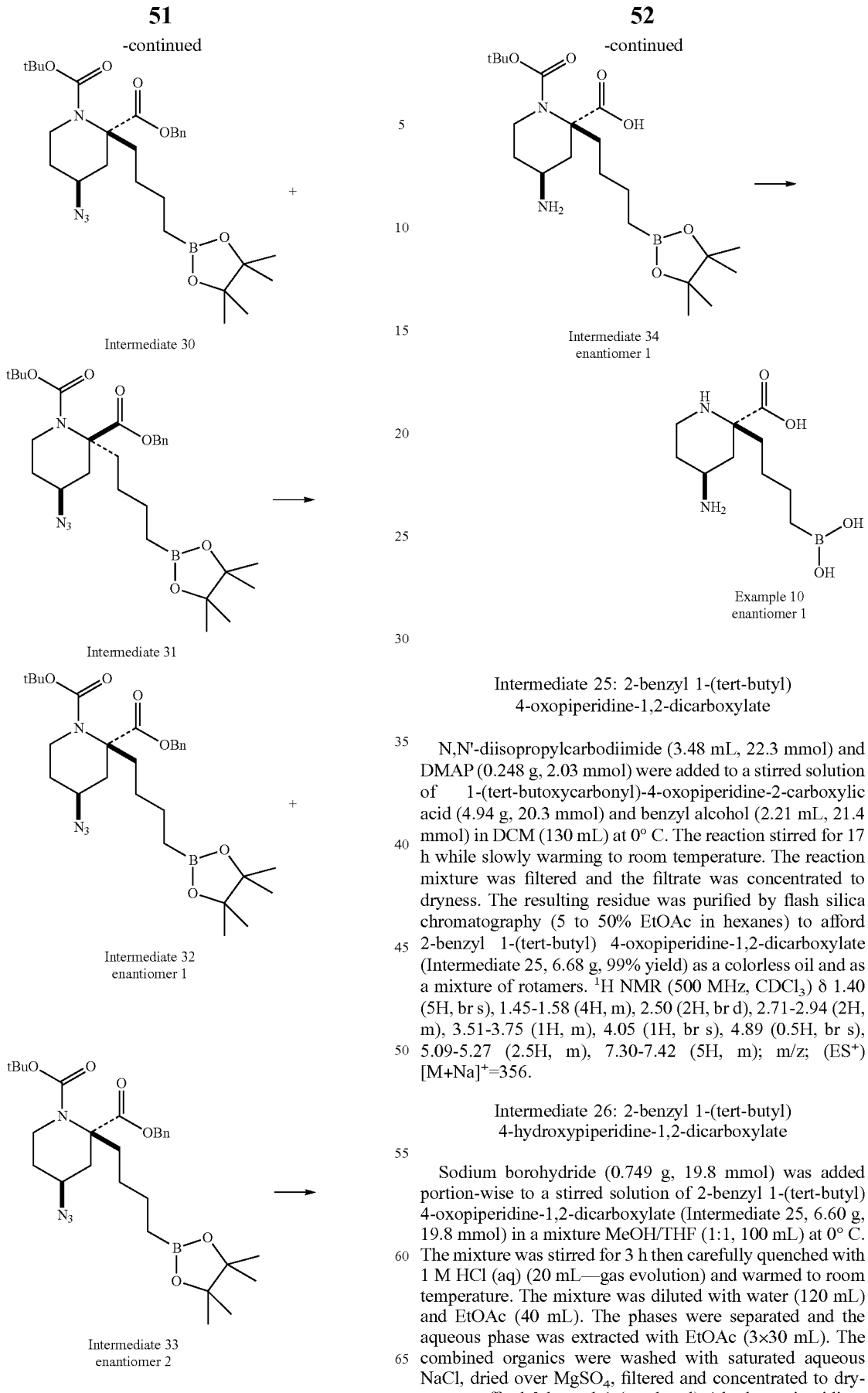

Intermediate 25: 2-benzyl 1-(tert-butyl) 4-oxopiperidine-1,2-dicarboxylate

N,N'-diisopropylcarbodiimide (3.48 mL, 22.3 mmol) and DMAP (0.248 g, 2.03 mmol) were added to a stirred solution of 1-(tert-butoxycarbonyl)-4-oxopiperidine-2-carboxylic acid (4.94 g, 20.3 mmol) and benzyl alcohol (2.21 mL, 21.4 mmol) in DCM (130 mL) at 0° C. The reaction stirred for 17 h while slowly warming to room temperature. The reaction mixture was filtered and the filtrate was concentrated to dryness. The resulting residue was purified by flash silica chromatography (5 to 50% EtOAc in hexanes) to afford 2-benzyl 1-(tert-butyl) 4-oxopiperidine-1,2-dicarboxylate (Intermediate 25, 6.68 g, 99% yield) as a colorless oil and as a mixture of rotamers. $^1$H NMR (500 MHz, CDCl$_3$) δ 1.40 (5H, br s), 1.45-1.58 (4H, m), 2.50 (2H, br d), 2.71-2.94 (2H, m), 3.51-3.75 (1H, m), 4.05 (1H, br s), 4.89 (0.5H, br s), 5.09-5.27 (2.5H, m), 7.30-7.42 (5H, m); m/z; (ES$^+$) [M+Na]$^+$=356.

Intermediate 26: 2-benzyl 1-(tert-butyl) 4-hydroxypiperidine-1,2-dicarboxylate Sodium borohydride (0.749 g, 19.8 mmol) was added portion-wise to a stirred solution of 2-benzyl 1-(tert-butyl) 4-oxopiperidine-1,2-dicarboxylate (Intermediate 25, 6.60 g, 19.8 mmol) in a mixture MeOH/THF (1:1, 100 mL) at 0° C. The mixture was stirred for 3 h then carefully quenched with 1 M HCl (aq) (20 mL—gas evolution) and warmed to room temperature. The mixture was diluted with water (120 mL) and EtOAc (40 mL). The phases were separated and the aqueous phase was extracted with EtOAc (3×30 mL). The combined organics were washed with saturated aqueous NaCl, dried over MgSO$_4$, filtered and concentrated to dryness to afford 2-benzyl 1-(tert-butyl) 4-hydroxypiperidine- 1,2-dicarboxylate (Intermediate 26, 6.87 g, 103%) as a clear gum. The crude material was taken forward directly without further purification. $^1$H NMR (500 MHz, CDCl$_3$) δ 1.34-1.42 (5H, m), 1.47 (4H, s), 1.56-1.78 (3H, m), 1.84-1.97 (1H, m), 2.48 (1H, brdd), 2.88-3.10 (1H, m), 3.63 (1H, brdd), 4.00 (0.5H, brd), 4.71 (0.5H, s), 4.87 (0.5H, br s), 5.08 (0.5H, br s), 5.13-5.26 (2H, m), 7.32-7.39 (5H, m); m/z; (ES$^+$) [M+Na]$^+$=358.

Intermediate 27: 2-benzyl 1-(tert-butyl) 4-((methylsulfonyl)oxy)piperidine-1,2-dicarboxylate Methanesulfonic anhydride (6.26 g, 36.0 mmol) was added portion-wise to a stirred solution of 2-benzyl 1-(tert-butyl) 4-hydroxypiperidine-1,2-dicarboxylate (Intermediate 26, 6.71 g, 19.9 mmol) and triethylamine (5.60 mL, 40.2 mmol) in DCM (100 mL) at 0° C. The cooling bath was allowed to expire and the reaction warmed to room temperature. After 15 h the reaction was diluted with DCM (100 mL) and washed sequentially with 1 M (aq) HCl (50 mL), water (50 mL), saturated aqueous NaHCO$_3$ (50 mL) and saturated aqueous NaCl (50 mL). The organic layer was dried over MgSO$_4$, filtered and concentrated to dryness to afford 2-benzyl 1-(tert-butyl) 4-((methylsulfonyl)oxy)piperidine-1,2-dicarboxylate (Intermediate 27, 7.74 g, 94% yield) as a pale orange gum and a mixture of rotamers and isomers. The crude material was taken forward directly without further purification. $^1$H NMR (500 MHz, CDCl$_3$) δ 1.39 (4H, br s), 1.43-1.48 (5H, m), 1.57 (0.5H, br s), 1.66-1.78 (1H, m), 1.84-1.95 (1H, m), 1.97-2.07 (0.5H, m), 2.08-2.20 (1H, m), 2.68-2.87 (1H, m), 2.93-3.00 (3H, m), 3.98-4.07 (0.6H, m), 4.14-4.24 (0.4H, m), 4.52-4.72 (1H, m), 4.86-5.05 (1H, m), 5.08-5.22 (2H, m), 7.34-7.41 (5H, m); m/z; (ES$^+$) [M+Na]$^+$=436.

Intermediate 28: 2-benzyl 1-(tert-butyl) 4-azidopiperidine-1,2-dicarboxylate

Sodium azide (6.05 g, 93.1 mmol) was added to a stirred solution of 2-benzyl 1-(tert-butyl) 4-((methylsulfonyl)oxy) piperidine-1,2-dicarboxylate (Intermediate 27, 7.73 g, 18.6 mmol) in DMF (50 mL). The reaction was heated to 60° C. and stirred for 21 h. The reaction mixture was cooled to room temperature, filtered and the filtrate was diluted with water (500 mL) and EtOAc (50 mL). The phases were separated and the aqueous phase was extracted with EtOAc (4×40 mL). The combined organics were washed with saturated aqueous NaCl (2×40 mL), dried over MgSO$_4$, filtered and concentrated to dryness. The resulting residue was purified by flash silica chromatography (5 to 35% EtOAc in hexanes) to afford 2-benzyl 1-(tert-butyl) 4-azidopiperidine-1,2-dicarboxylate (Intermediate 28, 5.26 g, 78% yield) as a pale yellow gum and as a mixture of rotamers and isomers. $^1$H NMR (500 MHz, CDCl$_3$) δ 1.38 (4H, br s), 1.46 (5H, br s), 1.64-1.74 (1H, m), 1.74-1.86 (1H, m), 1.95 (1H, ddd), 2.43-2.59 (1H, m), 3.13-3.38 (1H, m), 3.83 (0.5H, brd), 3.90-4.09 (1.5H, m), 4.68 (0.5H, br s), 4.88 (0.5H, br s), 5.10-5.36 (2H, m), 7.30-7.43 (5H, m); m/z; (ES$^+$) [M-Boc]$^+$=261.

Intermediate 29: 2-benzyl 1-(tert-butyl) 4-azido-2-(but-2-enyl)piperidine-1,2-dicarboxylate 2-Benzyl 1-(tert-butyl) 4-azidopiperidine-1,2-dicarboxylate (Intermediate 28, 5.26 g, 14.6 mmol) and crotyl bromide (2.65 mL, 21.9 mmol) were dissolved in THF (100 mL) and the solution was cooled to −78° C. A solution of KHMDS (1 M in 2-methyltetrahydrofuran, 22.0 mL, 22.0 mmol) was added dropwise over 10 min. The reaction mixture was slowly warmed to room temperature and stirred for a total of 5 h. The crude reaction mixture was quenched with saturated aqueous NH$_4$Cl then diluted with saturated aqueous NaCl and EtOAc (50 mL). The phases were separated and the aqueous layer was extracted with EtOAc (3×40 mL). The combined organics were washed with saturated aqueous NaCl, dried over MgSO$_4$, filtered and concentrated to dryness. The resulting residue was purified by flash silica chromatography (2 to 40% EtOAc in hexanes) to afford 2-benzyl 1-(tert-butyl) 4-azido-2-(but-2-enyl)piperidine-1,2-dicarboxylate (Intermediate 29, 5.13 g, 85% yield) as a clear pale yellow oil and as a mixture of diastereomers, rotamers and E/Z olefins. $^1$H NMR (500 MHz, CD$_2$Cl$_2$) δ 1.37 (4H, br s), 1.39 (5H, s), 1.40-1.43 (1H, m), 1.45-1.54 (1H, m), 1.54-1.62 (1H, m), 1.67 (3H, dd), 1.79-1.89 (1H, m), 1.91-2.01 (2H, m), 2.03-2.08 (1H, m), 2.08-2.15 (1H, m), 2.38 (1H, dd), 2.50-2.66 (1H, m), 2.67-2.83 (1H, m), 2.94-3.11 (1H, m), 3.17 (1H, brdd), 3.32 (1H, ddd), 3.56-3.75 (2H, m), 3.99 (1H, dt), 5.05-5.25 (1H, m), 5.35-5.43 (1H, m), 5.49-5.64 (2H, m), 7.29-7.39 (5H, m); m/z; (ES$^+$) [M+H]$^+$=415.

Intermediate 30: anti-2-benzyl 1-(tert-butyl) 4-azido-2-[4-(4,4,5,5-tetramethyl-1,3,2-dioxaborolan-2-yl)butyl]piperidine-1,2-dicarboxylate and Intermediate 31: syn-2-benzyl 1-(tert-butyl) 4-azido-2-[4-(4,4,5,5-tetramethyl-1,3,2-dioxaborolan-2-yl)butyl]piperidine-1,2-dicarboxylate Bis(1,5-cyclooctadiene)diiridium(I) dichloride (415 mg, 0.618 mmol) and bis(diphenylphosphino)methane (475 mg, 1.24 mmol) were added to an oven-dried round-bottom flask. The flask was sealed and purged with N$_2$. The solids were dissolved in DCM (90 mL) and 4,4,5,5-tetramethyl-1, 3,2-dioxaborolane (2.70 mL, 18.6 mmol) was slowly added to the solution. The reaction was stirred at room temperature for 10 min. 2-Benzyl 1-(tert-butyl) 4-azido-2-(but-2-enyl) piperidine-1,2-dicarboxylate (Intermediate 29, 5.12 g, 12.4 mmol) was added as a solution in DCM (30 mL) and reaction stirred at room temperature for 46 h. The reaction mixture was cooled to 0° C. and carefully quenched with MeOH (2 mL) and water (50 mL). The layers were separated and the aqueous layer was extracted with DCM (3×30 mL). The combined organics were dried over MgSO$_4$, filtered and concentrated to dryness. The resulting residue was purified by flash silica chromatography (5 to 20% EtOAc in hexanes) to afford anti-2-benzyl 1-(tert-butyl) 4-azido-2-[4-(4,4,5,5-tetramethyl-1,3,2-dioxaborolan-2-yl)butyl]piperidine-1,2-dicarboxylate (Intermediate 30, 2.01 g, 30% yield) as the first eluting diastereomer as a colorless gum and syn-2-benzyl 1-(tert-butyl) 4-azido-2-[4-(4,4,5,5-tetramethyl-1,3, 2-dioxaborolan-2-yl)butyl]piperidine-1,2-dicarboxylate (Intermediate 31, 2.07 g, 31% yield) as the second eluting diastereomers as a colorless gum.

Intermediate 30: $^1$H NMR (500 MHz, CDCl$_3$) δ 0.80 (2H, t), 1.25 (12H, s), 1.28-1.36 (2H, m), 1.38 (8H, s), 1.40-1.44 (2H, m), 1.44-1.48 (1H, m), 1.49-1.54 (1H, m), 1.67-1.78 (1H, m), 1.87-2.03 (2H, m), 2.07-2.19 (1H, m), 2.50 (1H, td), 3.42 (1H, ddd), 3.46-3.58 (1H, m), 3.66-3.77 (1H, m), 5.09-5.21 (2H, m), 7.29-7.43 (5H, m); m/z; (ES$^+$) [M+Na]$^+$=565.

Intermediate 31: $^1$H NMR (500 MHz, CDCl$_3$) δ 0.79 (2H, br t), 1.25 (12H, s), 1.30-1.39 (2H, m), 1.39-1.44 (11H, m), 1.58-1.69 (1H, m), 1.86-1.94 (3H, m), 1.94-2.00 (1H, m), 2.01-2.09 (1H, m), 2.94-3.09 (1H, m), 3.52-3.66 (1H, m), 4.05 (1H, br d), 5.03-5.25 (2H, m), 7.29-7.39 (5H, m); m/z; (ES⁺) [M+Na]⁺=565.

Intermediate 32: anti-2-benzyl 1-(tert-butyl) 4-azido-2-[4-(4,4,5,5-tetramethyl-1,3,2-dioxaborolan-2-yl)butyl]piperidine-1,2-dicarboxylate enantiomer 1 and Intermediate 33: anti-2-benzyl 1-(tert-butyl) 4-azido-2-[4-(4,4,5,5-tetramethyl-1,3,2-dioxaborolan-2-yl)butyl]piperidine-1,2-dicarboxylate enantiomer 2 anti-2-Benzyl 1-(tert-butyl) 4-azido-2-[4-(4,4,5,5-tetramethyl-1,3,2-dioxaborolan-2-yl)butyl]piperidine-1,2-dicarboxylate (Intermediate 30, 2 g, 3.69 mmol) was subjected to chiral SFC [(S,S)Whelk-O1 column, 21.2 mm×250 mm, 5 µm, Temperature=20° C., Mobile phase=20% isopropanol: $CO_2$, UV detection @ 220 nm, loading=25 mg/inj, conc=100 mg/mL in MeCN, flow rate=70 mL/min, Outlet Pressure=100 bar] to afford enantiomer 1 of anti-2-benzyl 1-(tert-butyl) 4-azido-2-[4-(4,4,5,5-tetramethyl-1,3,2-dioxaborolan-2-yl)butyl]piperidine-1,2-dicarboxylate (Intermediate 32, 980 mg, 49% yield, 96% ee) as the first eluting enantiomer as a colorless gum and enantiomer 2 of anti-2-benzyl 1-(tert-butyl) 4-azido-2-[4-(4,4,5,5-tetramethyl-1,3,2-dioxaborolan-2-yl)butyl]piperidine-1,2-dicarboxylate (Intermediate 33, 957 mg, 48% yield, 98% ee) as the second eluting enantiomer as a colorless gum.

Intermediate 32: ¹H NMR (500 MHz, CDCl₃) δ 0.80 (2H, t), 1.25 (12H, s), 1.27-1.35 (2H, m), 1.38 (9H, s), 1.41-1.47 (2H, m), 1.49-1.53 (1H, m), 1.68-1.78 (1H, m), 1.89-2.03 (2H, m), 2.08-2.18 (1H, m), 2.42-2.56 (1H, m), 3.42 (1H, ddd), 3.47-3.56 (1H, m), 3.68-3.77 (1H, m), 5.09-5.22 (2H, m), 7.31-7.42 (5H, m); m/z; (ES⁺) [M+Na]⁺=565.

Intermediate 33: ¹H NMR (500 MHz, CDCl₃) δ 0.80 (2H, t), 1.25 (12H, s), 1.27-1.35 (2H, m), 1.38 (9H, s), 1.41-1.48 (2H, m), 1.49-1.52 (1H, m), 1.67-1.77 (1H, m), 1.88-1.96 (1H, m), 1.96-2.03 (1H, m), 2.09-2.18 (1H, m), 2.50 (1H, td), 3.42 (1H, ddd), 3.51 (1H, dq), 3.67-3.76 (1H, m), 5.10-5.22 (2H, m), 7.32-7.41 (5H, m); m/z; (ES⁺) [M+Na]⁺=565.

Intermediate 34: anti-4-amino-1-tert-butoxycarbonyl-2-[4-(4,4,5,5-tetramethyl-1,3,2-dioxaborolan-2-yl)butyl]piperidine-2-carboxylic acid enantiomer 1

Pd/C (10% wt, 50 mg, 0.047 mmol) was added to a solution of anti-2-benzyl 1-(tert-butyl) 4-azido-2-[4-(4,4,5,5-tetramethyl-1,3,2-dioxaborolan-2-yl)butyl]piperidine-1,2-dicarboxylate enantiomer 1 (Intermediate 32, 250 mg, 0.46 mmol) in EtOAc (3 mL). The suspension was stirred under a hydrogen atmosphere (balloon, flask evacuated and backfilled with hydrogen x3) at room temperature for 20 h. The reaction mixture was diluted with MeOH (5 mL), filtered through diatomaceous earth and concentrated to dryness. The resulting residue was purified by flash silica chromatography (5 to 55% MeOH in DCM) to afford anti-4-amino-1-tert-butoxycarbonyl-2-[4-(4,4,5,5-tetramethyl-1,3,2-dioxaborolan-2-yl)butyl]piperidine-2-carboxylic acid enantiomer 1 (Intermediate 34, 159 mg, 82% yield) as a white solid. ¹H NMR (500 MHz, DMSO-d6) δ 0.64 (2H, td), 1.16 (12H, s), 1.18-1.25 (2H, m), 1.25-1.30 (2H, m), 1.32 (9H, s), 1.34-1.46 (2H, m), 1.49-1.61 (1H, m), 1.84-1.99 (2H, m), 2.91-3.04 (1H, m), 3.27 (1H, br s), 3.37-3.49 (2H, m); m/z; (ES⁺) [M+H]⁺=427.

Example 10: Anti-4-amino-2-(4-boronobutyl)piperidine-2-carboxylic acid enantiomer 1

Trifluoroacetic acid (0.58 mL, 7.5 mmol) was added dropwise to a stirred solution of anti-4-amino-1-tert-butoxycarbonyl-2-[4-(4,4,5,5-tetramethyl-1,3,2-dioxaborolan-2-yl)butyl]piperidine-2-carboxylic acid enantiomer 1 (Intermediate 34,159 mg, 0.37 mmol) in DCM (2 mL) at room temperature. After 2 h the solution was concentrated under reduced pressure and the resulting residue was dissolved in 1 M HCl (aq) (3.0 mL, 3.0 mmol) and Et₂O (3 mL). Phenylboronic acid (136 mg, 1.12 mmol) was added and the clear biphasic solution stirred at room temperature for 4 h. The mixture was diluted with Et₂O (20 mL) and water (5 mL) and the layers were separated. The aqueous layer was washed with Et₂O. The aqueous layer was lyophilized and purified by ion exchange chromatography (PoraPak Rxn CX 20 cc column). The desired product was eluted from the column using 5% ammonia in MeOH (20 mL) to afford anti-4-amino-2-(4-boronobutyl)piperidine-2-carboxylic acid enantiomer 1 (Example 10, 84 mg, 92% yield) as a white solid. ¹H NMR (500 MHz, D₂O) δ 0.75 (2H, t), 1.18-1.29 (2H, m), 1.30-1.42 (3H, m), 1.43-1.52 (1H, m), 1.55-1.65 (1H, m), 1.65-1.73 (1H, m), 1.96-2.03 (1H, m), 2.44-2.53 (1H, m), 2.95 (1H, td), 3.04 (1H, tt), 3.11-3.19 (1H, m); m/z; (ES⁺) [M+H]⁺=245.

Example 11: anti-4-amino-2-(4-boronobutyl)piperidine-2-carboxylic acid enantiomer 2

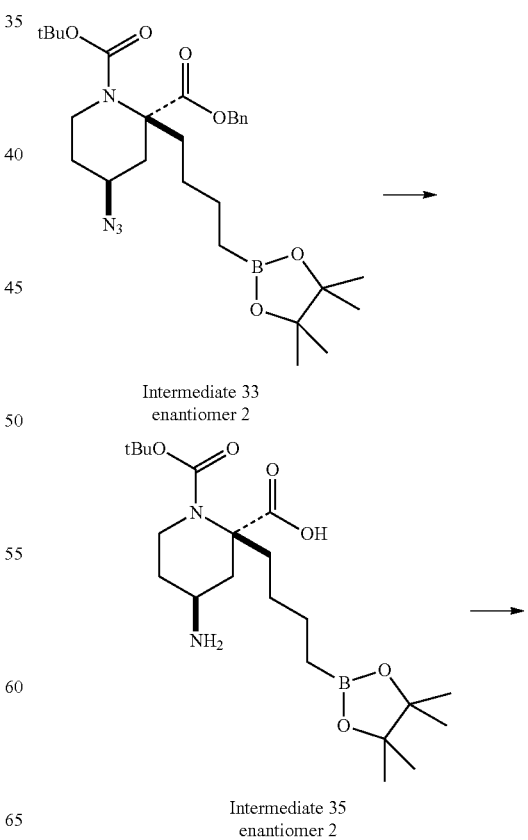

Intermediate 33 enantiomer 2

Intermediate 35 enantiomer 2

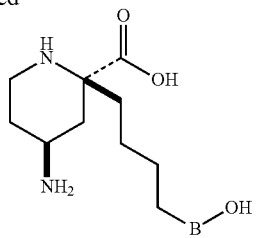

Example 11
enantiomer 2

Intermediate 35: anti-4-amino-1-tert-butoxycarbonyl-2-[4-(4,4,5,5-tetramethyl-1,3,2-dioxaborolan-2-yl)butyl]piperidine-2-carboxylic acid enantiomer 2

Pd/C (10% wt, 25 mg, 0.023 mmol) was added to a solution of anti-2-benzyl 1-(tert-butyl) 4-azido-2-[4-(4,4,5,5-tetramethyl-1,3,2-dioxaborolan-2-yl)butyl]piperidine-1,2-dicarboxylate enantiomer 2 (Intermediate 33, 138 mg, 0.25 mmol) in a mixture of EtOAc/isopropanol (2:1.3 mL). The suspension was stirred under a hydrogen atmosphere (balloon, flask evacuated and back-filled with hydrogen ×3) at room temperature for 16 h. The reaction mixture was diluted with MeOH (5 mL), filtered through diatomaceous earth and concentrated to dryness to afford anti-4-amino-1-tert-butoxycarbonyl-2-[4-(4,4,5,5-tetramethyl-1,3,2-dioxaborolan-2-yl)butyl]piperidine-2-carboxylic acid enantiomer 2 (Intermediate 35, 118 mg, 109% yield) as a white solid and as a mixture of rotamers. The crude material was taken forward directly without further purification. $^1$H NMR (500 MHz, CD$_2$Cl$_2$) δ 0.61-0.80 (2H, m), 0.93-1.15 (2H, m), 1.18-1.24 (12H, m), 1.24-1.38 (3H, m), 1.42 (9H, br s), 1.47-1.67 (2H, m), 1.70-1.91 (1H, m), 1.97-2.15 (1H, m), 2.16-2.34 (1H, m), 2.44 (1H, br s), 3.20-3.40 (1H, m), 3.55 (2H, br s), 8.35 (2H, br s); m/z; (ES$^+$) [M+H]$^+$=427.

Example 11: anti-4-amino-2-(4-boronobutyl)piperidine-2-carboxylic acid enantiomer 2

Trifluoroacetic acid (0.43 mL, 5.5 mmol) was added dropwise to a stirred solution of anti-4-amino-1-tert-butoxycarbonyl-2-[4-(4,4,5,5-tetramethyl-1,3,2-dioxaborolan-2-yl)butyl]piperidine-2-carboxylic acid enantiomer 2 (Intermediate 35, 118 mg, 0.277 mmol) in DCM (2 mL) at room temperature. After 2 h the solution was concentrated under reduced pressure and the resulting residue was dissolved in 1 M HCl (aq) (2.0 mL, 2.0 mmol) and Et$_2$O (2 mL). Phenylboronic acid (101 mg, 0.83 mmol) was added and the clear biphasic solution stirred at room temperature for 3 h. The mixture was diluted with Et$_2$O (20 mL) and water (5 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL). The obtained material was further purified by reverse phase chromatography (RediSep Rf Gold® C18, 0 to 95% acetonitrile in water) to afford anti-4-amino-2-(4-boronobutyl)piperidine-2-carboxylic acid enantiomer 2 (Example 11.41 mg, 61% yield) as a white solid. $^1$H NMR (500 MHz, D$_2$O) δ 0.70 (2H, t), 1.14-1.24 (2H, m), 1.24-1.37 (3H, m), 1.37-1.45 (1H, m), 1.51-1.59 (1H, m), 1.59-1.67 (1H, m), 1.91-1.98 (1H, m), 2.43 (1H, dt), 2.89 (1H, td), 2.98 (1H, tt), 3.07-3.13 (1H, m); m/z; (ES$^+$) [M+H]$^+$=245.

Example 12: syn-4-amino-2-(4-boronobutyl)piperidine-2-carboxylic acid enantiomer 1

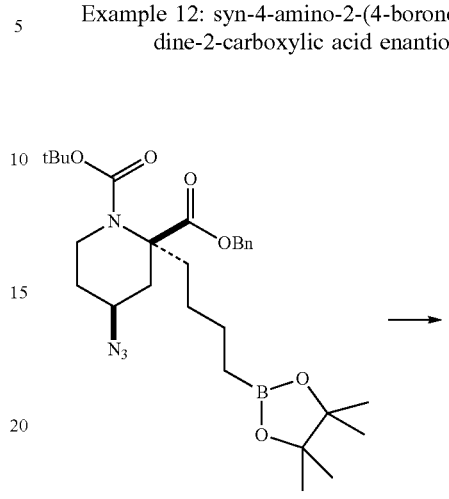

Intermediate 31

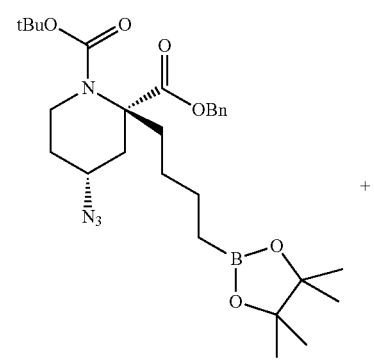

Intermediate 36
enantiomer 1

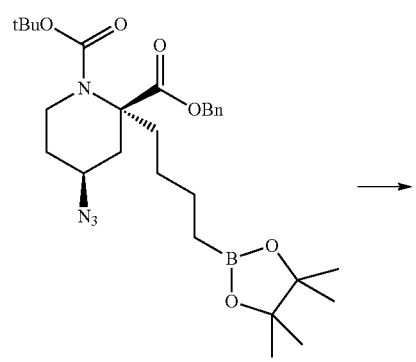

Intermediate 6
enantiomer 2

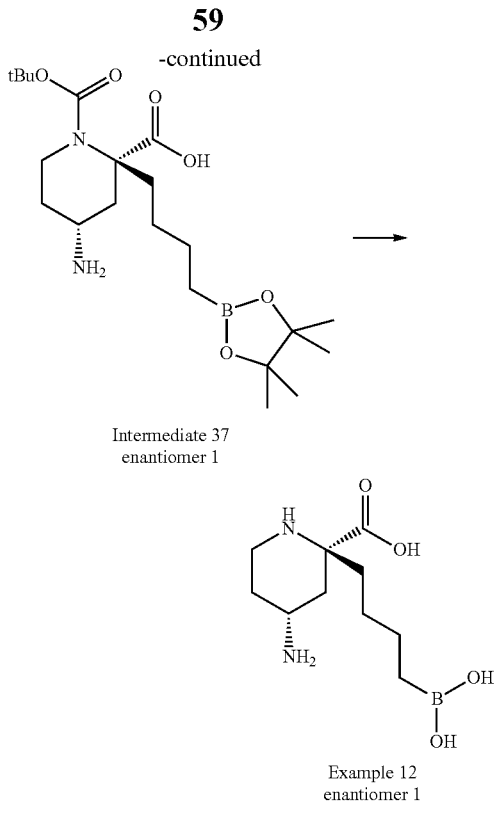

Intermediate 37
enantiomer 1

Example 12
enantiomer 1

Intermediate 36: 2-benzyl 1-(tert-butyl) (2S,4R)-4-azido-2-(4-(4,4,5,5-tetramethyl-1,3,2-dioxaborolan-2-yl)butyl)piperidine-1,2-dicarboxylate (enantiomer 1) and Intermediate 6: 2-benzyl 1-(tert-butyl) (2R,4S)-4-azido-2-(4-(4,4,5,5-tetramethyl-1,3,2-dioxaborolan-2-yl)butyl)piperidine-1,2-dicarboxylate (enantiomer 2)

syn-2-Benzyl 1-(tert-butyl) 4-azido-2-[4-(4,4,5,5-tetramethyl-1,3,2-dioxaborolan-2-yl)butyl]piperidine-1,2-dicarboxylate (Intermediate 31, 2.0 g, 3.7 mmol) was subjected to chiral SFC [(S,S)Whelk-O1 column, 4.6 mm×100 mm, 5 µm, Temperature=20° C., Mobile phase=20% isopropanol: $CO_2$, UV detection @ 220 nm, loading=25 mg/inj, conc=100 mg/mL in MeCN, flow rate=70 mL/min, Outlet Pressure=100 bar] to afford enantiomer 1 of syn-2-benzyl 1-(tert-butyl) (2S,4R)-4-azido-2-(4-(4,4,5,5-tetramethyl-1,3,2-dioxaborolan-2-yl)butyl)piperidine-1,2-dicarboxylate (Intermediate 36, 994 mg, 49% yield, 98% ee) as the first eluting enantiomer as a colorless gum and enantiomer 2 of syn-2-benzyl 1-(tert-butyl) (2R,4S)-4-azido-2-(4-(4,4,5,5-tetramethyl-1,3,2-dioxaborolan-2-yl)butyl)piperidine-1,2-dicarboxylate (Intermediate 6, 1.04 g, 51% yield, 98% ee) as the second eluting enantiomer as a colorless gum. Absolute stereochemistry of enantiomer 2 was determined by SFC with comparison to previously synthesized Intermediate 6. Absolute stereochemistry of Intermediate 36 was assigned by analogy.

Intermediate 36: $^1$H NMR (500 MHz, CDCl$_3$) δ 0.79 (2H, br t), 1.25 (12H, s), 1.29-1.36 (1H, m), 1.38 (1H, br d), 1.41 (11H, s), 1.56-1.68 (1H, m), 1.85-1.94 (3H, m), 1.97 (1H, br d), 2.05 (1H, br dd), 2.94-3.07 (1H, m), 3.54-3.65 (1H, m), 4.03 (1H, t), 5.06-5.25 (2H, m), 7.30-7.39 (5H, m); m/z; (ES$^+$) [M+Na]$^+$=565.

Intermediate 6: $^1$H NMR (500 MHz, CDCl$_3$) δ 0.79 (2H, br t), 1.25 (12H, s), 1.30-1.36 (1H, m), 1.36-1.39 (1H, m), 1.41 (11H, s), 1.56-1.67 (1H, m), 1.85-1.94 (3H, m), 1.94-2.01 (1H, m), 2.05 (1H, br dd), 2.96-3.05 (1H, m), 3.54-3.64 (1H, m), 4.01-4.05 (1H, m), 5.06-5.23 (2H, m), 7.29-7.38 (5H, m); m/z; (ES$^+$) [M+Na]$^+$=565.

Intermediate 37: (2S,4R)-4-amino-1-(tert-butoxycarbonyl)-2-(4-(4,4,5,5-tetramethyl-1,3,2-dioxaborolan-2-yl)butyl)piperidine-2-carboxylic acid Pd/C (10% wt, 50 mg, 0.047 mmol) was added to a solution of syn-2-benzyl 1-(tert-butyl) (2S,4R)-4-azido-2-(4-(4,4,5,5-tetramethyl-1,3,2-dioxaborolan-2-yl)butyl)piperidine-1,2-dicarboxylate (Intermediate 36, 250 mg, 0.46 mmol) in EtOAc (3 mL). The suspension was stirred under a hydrogen atmosphere (balloon, flask evacuated and back-filled with hydrogen ×3) at room temperature for 17 h. The reaction mixture was diluted with MeOH (5 mL), filtered through diatomaceous earth and concentrated to dryness. The resulting residue was purified by flash silica chromatography (5 to 40% MeOH in DCM) to afford (2S,4R)-4-amino-1-(tert-butoxycarbonyl)-2-(4-(4,4,5,5-tetramethyl-1,3,2-dioxaborolan-2-yl)butyl)piperidine-2-carboxylic acid (Intermediate 37, 149 mg, 76% yield) as a white solid. $^1$H NMR (500 MHz, CD$_2$Cl$_2$) δ 0.71 (2H, br t), 1.05-1.15 (1H, m), 1.19 (14H, s), 1.29-1.37 (2H, m), 1.40 (9H, s), 1.75-1.94 (1H, m), 1.95-2.20 (3H, m), 2.23-2.48 (1H, m), 3.02 (1H, br s), 3.54 (1H, br s), 3.92 (1H, br s), 8.64 (3H, br s); m/z; (ES$^+$) [M+H]$^+$=427.

Example 12: (2S,4R)-4-amino-2-(4-boronobutyl)piperidine-2-carboxylic acid

Trifluoroacetic acid (0.43 mL, 5.5 mmol) was added dropwise to a stirred solution of (2S,4R)-4-amino-1-(tert-butoxycarbonyl)-2-(4-(4,4,5,5-tetramethyl-1,3,2-dioxaborolan-2-yl)butyl)piperidine-2-carboxylic acid (Intermediate 37, 146 mg, 0.342 mmol) in DCM (2 mL) at room temperature. After 2 h the solution was concentrated under reduced pressure and the resulting residue was dissolved in 1 M HCl (aq) (3.0 mL, 3.0 mmol) and Et$_2$O (3 mL). Phenylboronic acid (125 mg, 1.03 mmol) was added and the clear biphasic solution stirred at room temperature for 4 h. The mixture was diluted with Et$_2$O (20 mL) and water (5 mL) and the layers were separated. The aqueous layer was washed with Et$_2$O. The aqueous layer was lyophilized and purified by ion exchange chromatography (PoraPak Rxn CX 20 cc column). The desired product was eluted from the column using 5% ammonia in MeOH (20 mL) to afford (2S,4R)-4-amino-2-(4-boronobutyl)piperidine-2-carboxylic acid (Example 12, 63 mg, 75% yield). $^1$H NMR (500 MHz, D$_2$O) δ 0.70-0.82 (2H, m), 1.10-1.31 (2H, m), 1.35-1.44 (2H, m), 1.45-1.54 (1H, m), 1.62 (1H, dd), 1.76 (1H, ddd), 1.84-1.94 (1H, m), 2.00-2.08 (1H, m), 2.18 (1H, ddd), 3.07 (1H, td), 3.22 (1H, dt), 3.33 (1H, tt); m/z; (ES$^+$) [M+H]$^+$=245.

Example 13: Biological Activity of Examples 1 to 12

The inhibitory effects of Examples 1 to 12 on the activity of Human Arginase 1 and Arginase 2 activity were quantified by measuring the formation of the thiol group from thioarginine using recombinant Arginase 1 or Arginase 2 produced from *E. coli*. The thiol group was detected with Ellman's reagent, 5,5'-dithiobis(2-nitrobenzoic acid) (DTNB). DTNB reacts with the thiol to give the mixed disulfide and 2-nitro-5-thiobenzoic acid (TNB) which is quantified by the absorbance of the anion (TNB$^{2-}$) at 412 nm.

The assays were run in clear 384 well plates (Greiner cat no: 781101). Various concentrations of Examples 1 to 12 in 300 nL DMSO were dispensed to assay plates using an Echo acoustic dispenser immediately followed by plate sealing and centrifugation. Two pre-mixes were prepared from reagents thawed immediately before addition to assay plates. Pre-mix one comprised human Arginase 1 or human Arginase 2, at a final concentration of 5 nM and 0.5 mM DTNB in assay buffer, 45 mM HEPES pH7.5, brij 35, 0.045% (w/v) and 100 µM MnCl$_2$. Pre-mix two comprised freshly thawed 0.5 mM thioarginine in assay buffer. Fifteen microlitres of pre-mix one was dispensed to assay plates containing Examples 1 to 12, centrifuged and incubated for 30 minutes at room temperature prior to adding fifteen microlitres of pre-mix two.

Assay plates were centrifuged prior to reading absorbance at 412 nm in a Pherastar multi-mode plate reader to collect data at time point 0 (T0). The plates were incubated at room temperature for 60 min prior to reading again to collect data at time point 1 (T1). Data is derived by subtracting the A412 signal measured at T0 (time point 0) from that measured at T1 (time point 1). The data was transformed to % effect using the equation:

Compound % effect=100*[(X−min)/(max−min)], where X represents the normalized value for the compound based on the Min (vehicle) and Max (reference compound) inhibition control.

The concentration of Examples 1 to 12 that inhibited the activity by 50% (i.e. the IC$_{50}$) was calculated by plotting the % effect versus test compound concentration and fitting the data using the Genedata Screener Smart fit algorithm. The results of these assays are found in Table 2:

TABLE 2

| Example | Human Arginase 1 Enzyme IC$_{50}$ (µM) | Human Arginase 2 Enzyme IC$_{50}$ (µM) |
| --- | --- | --- |
| 1 | 0.003 | 0.004 |
| 2 | 0.029 | 0.024 |
| 3 | 0.080 | 0.059 |
| 4 | 0.035 | 0.027 |
| 5 | 0.025 | 0.021 |
| 6 | 0.018 | 0.015 |
| 7 | 0.023 | 0.021 |
| 8 | 0.031 | 0.024 |
| 9 | 0.234 | 0.180 |
| 10 | 20.149 | 53.109 |
| 11 | 3.151 | 4.368 |
| 12 | 2.197 | 2.542 |

Example 14: Bioavailability Studies

Examples 2, 3, and 4 are prodrug forms of Example 1. The following pharmacokinetic study was performed to demonstrate bioavailability of Example 1 from Example 2. Example 2 was formulated in 0.9% w/v saline pH 4 (adjusted with 1M HCl) for IV dosing. The formulation was dosed at 2 mg/kg by femoral catheter to two male rats each (170-250 g). Jugular vein catheter serial blood samples were taken at 0.033, 0.083, 0.167, 0.5, 1, 2, 4, 8, and 24 hrs post-dose. For PO dosing, Example 2 was formulated in deionized water pH 4 (adjusted with 1M HCl) and dosed at 5 mg/kg by oral gavage to two male rats each (170-250 g). Serial blood samples were taken by jugular vein catheter at 0.25, 0.5, 1, 1.5, 2, 3, 4, 8, and 24 hrs post dose. Plasma samples were generated from blood using low speed centrifugation. A single set of calibration standards containing Example 1 and Example 2 were prepared by spiking blank plasma. The samples and standards were extracted by precipitation with two volumes of acetonitrile followed by centrifugation. The results obtained were used to determine the Cl (mL/min/kg), Vdss (L/kg), Cmax (µM), AUC (µM h), tmax (h), and % F for both Example 1 and Example 2. Absolute bioavailability was determined by comparing the PO dose normalized AUC of Example 1 when dosed as Example 2, versus the dose normalized IV AUC of Example 1 when dosed as Example 1. Where appropriate, measured and not nominal doses were used to calculate bioavailability. In an analogous fashion, the same procedure was repeated for Examples 3 and 4. The results are shown in Tables 3 to 5. These results indicate that bioavailability may be increased by incorporating certain amino acid moieties as prodrugs.

TABLE 3

|  | Example 2 | Example 1 |
| --- | --- | --- |
| Cl (mL/min/kg) | 16.3 # | 8.5 * |
| Vdss (L/kg) | 0.25 # | 0.23 * |
| PO Cmax (µM) | 0.35 # | 2.5 # |
| PO AUC (µM · h) | 0.29 # | 23.7 # |
| Tmax (h) | 0.25 # | 2.3 # |
| % F | 2.0 # | 82 # | observed value when dosed a pro-drug
* Observed value when dosed as payload.
NV No reportable value

TABLE 4

|  | Example 3 | Example 1 |
| --- | --- | --- |
| Cl (mL/min/kg) | 13.5 # | 8.5 * |
| Vdss (L/kg) | 0.22 # | 0.23 * |
| PO Cmax (µM) | 0.64 # | 2.0 # |
| PO AUC (µM · h) | 1.1 # | 25.7 # |
| Tmax (h) | 0.75 # | 2.5 # |
| % F | 5.2 # | 78 # | observed value when dosed a pro-drug
* Observed value when dosed as payload.
NV No reportable value

TABLE 5

|  | Example 4 | Example 1 |
| --- | --- | --- |
| Cl (mL/min/kg) | 180 # | 8.5 * |
| Vdss (L/kg) | NV # | 0.23 * |
| PO Cmax (µM) | NV # | 1.0 # |
| PO AUC (µM · h) | NV # | 6.1 # |
| Tmax (h) | NV # | 1.5 # |
| % F | NV # | 20 # | observed value when dosed a pro-drug
* Observed value when dosed as payload.
NV No reportable value

The invention claimed is:

1. A compound of formula (I), or a pharmaceutically acceptable salt thereof:

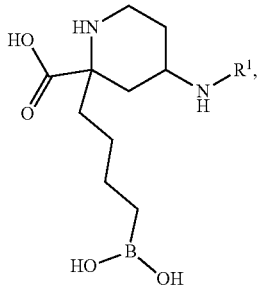

(I)

wherein
R$^1$ is —H or —C(O)CH(R$^{1a}$)NHR$^{1b}$; and
R$^{1a}$ is selected from —H, —(C$_1$-C$_6$) alkyl and CH$_2$OR$^{1c}$;
R$^{1b}$ is —H; or alternatively, R$^{1a}$ and R$^{1b}$, together with the atom to which they are attached, form a 5-membered heterocyclic ring; and
R$^{1c}$ is H or —CH$_3$.

2. The compound of claim 1 represented by formula (II), or a pharmaceutically acceptable salt thereof:

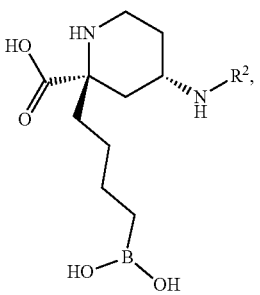

(II)

wherein
R$^2$ is —H or —C(O)CH(R$^{2a}$)NH$_2$; and
R$^{2a}$ is selected from —H or —(C$_1$-C$_6$) alkyl.

3. The compound of claim 1 represented by formula (III), or a pharmaceutically acceptable salt thereof:

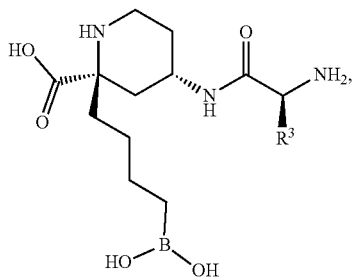

(III)

wherein
R$^3$ is selected from —H or —(C$_1$-C$_4$) alkyl.

4. The compound of claim 1 represented by formula (IV), or a pharmaceutically acceptable salt thereof:

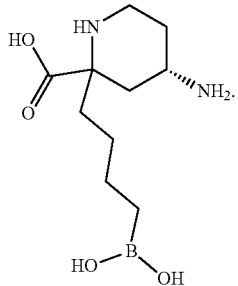

(IV)

5. A compound of formula (V), or a pharmaceutically acceptable salt thereof:

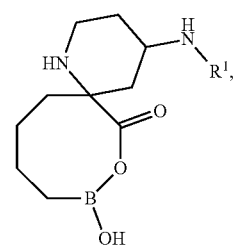

(V)

wherein
R$^1$ is —H or —C(O)CH(R$^{1a}$)NHR$^{1b}$; and
R$^{1a}$ is selected from —H, —(C$_1$-C$_4$) alkyl and CH$_2$OR$^{1c}$;
R$^{1b}$ is —H; or alternatively, R$^{1a}$ and R$^{1b}$, together with the atom to which they are attached, form a 5-membered heterocyclic ring; and
R$^{1c}$ is H or —CH$_3$.

6. The compound of claim 5 represented by formula (VI), or a pharmaceutically acceptable salt thereof:

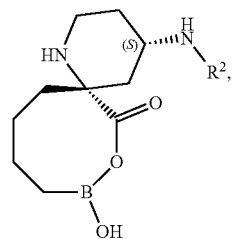

(VI)

wherein
R$^2$ is —H or —C(O)CH(R$^{2a}$)NH$_2$; and
R$^{2a}$ is selected from —H or —(C$_1$-C$_6$) alkyl.

7. The compound of claim 5 represented by formula (VII), or a pharmaceutically acceptable salt thereof:

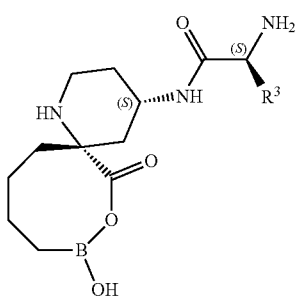
(VII)
wherein
R³ is selected from —H or —(C₁-C₄) alkyl.
8. The compound of claim 5 represented by formula (VIII), or a pharmaceutically acceptable salt thereof:
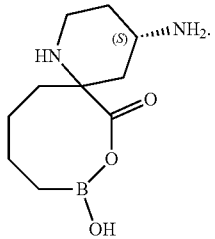
(VIII)
9. The compound of claim 1, or a pharmaceutically acceptable salt thereof, wherein the compound is selected from:
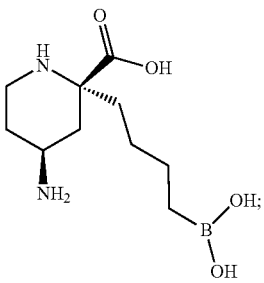
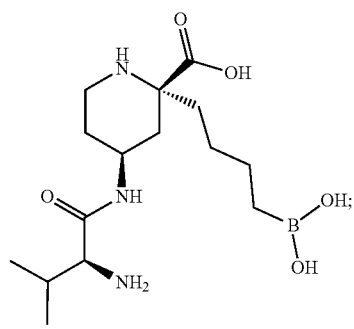
-continued
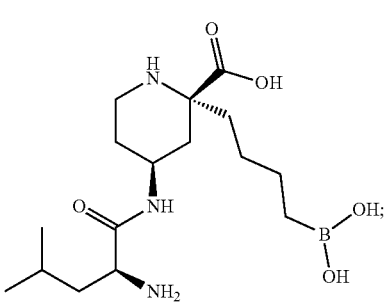
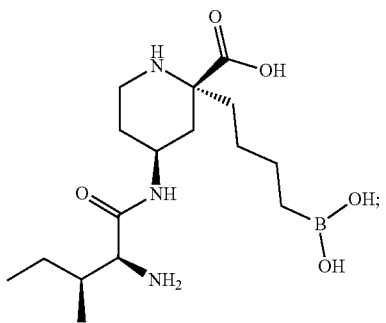

-continued

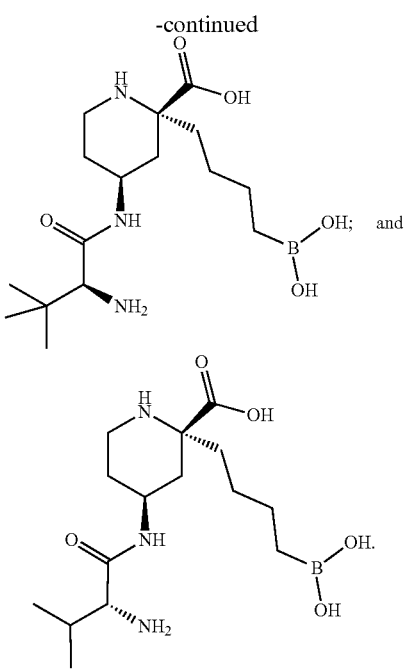

10. A pharmaceutical composition comprising a compound of claim 1, or a pharmaceutically acceptable salt thereof, and a pharmaceutically acceptable carrier.

11. A method of treating cancer in a patient comprising administering to the patient a therapeutically effective amount of a compound of claim 1, or a pharmaceutically acceptable salt thereof.

12. A method of treating respiratory inflammatory disease in a patient comprising administering to the patient a compound of claim 1, or a pharmaceutically acceptable salt thereof.

13. A pharmaceutical composition comprising a compound of claim 5, or a pharmaceutically acceptable salt thereof, and a pharmaceutically acceptable carrier.

14. A method of treating cancer in a patient comprising administering to the patient a therapeutically effective amount of a compound of claim 5, or a pharmaceutically acceptable salt thereof.

15. A method of treating respiratory inflammatory disease in a patient comprising administering to the patient a compound of claim 5, or a pharmaceutically acceptable salt thereof.

* * * * *